United States Patent
Heizer

(10) Patent No.: US 9,645,221 B1
(45) Date of Patent: May 9, 2017

(54) COMMUNICATION SYSTEM AND METHOD

(71) Applicant: BOOIE LLC, Lake Forest, IL (US)

(72) Inventor: Emma Grace Heizer, Lake Forest, IL (US)

(73) Assignee: Booie LLC, Lake Forest, IL (US)

( * ) Notice: Subject to any disclaimer, the term of this patent is extended or adjusted under 35 U.S.C. 154(b) by 51 days.

(21) Appl. No.: 14/573,693

(22) Filed: Dec. 17, 2014

Related U.S. Application Data

(60) Provisional application No. 61/917,249, filed on Dec. 17, 2013.

(51) Int. Cl.
| | |
|---|---|
| G06T 19/00 | (2011.01) |
| G01S 1/04 | (2006.01) |
| G06Q 30/02 | (2012.01) |
| G06T 11/60 | (2006.01) |
| H04W 4/02 | (2009.01) |

(52) U.S. Cl.
CPC .......... *G01S 1/047* (2013.01); *G06Q 30/0255* (2013.01); *G06T 11/60* (2013.01); *G06T 19/006* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 6,668,177 B2 | 12/2003 | Salmimaa et al. | |
| 7,454,357 B2 | 11/2008 | Buckwalter et al. | |
| 7,733,232 B2 | 6/2010 | Light et al. | |
| 8,000,726 B2 | 8/2011 | Altman et al. | |
| 8,010,460 B2 | 8/2011 | Work et al. | |
| 8,265,621 B2 | 9/2012 | Kopikare et al. | |
| 8,743,145 B1 * | 6/2014 | Price .................... | G06T 19/006 345/629 |
| 9,264,151 B1 * | 2/2016 | Emigh ............... | G06Q 30/0211 |
| 2006/0166740 A1 | 7/2006 | Sufuentes | |

(Continued)

FOREIGN PATENT DOCUMENTS

WO     2012/167087 A2     12/2012

OTHER PUBLICATIONS

Griswold et al., "Using Mobile Technology to Create Opportunistic Interactions on a University Campus", Ubicomp 2002 on Supporting Spontaneous Interaction in Ubiquitous Computer Settings, Technical Report CS20020724, Computer Science and Engineering, Dec. 2002, pp. 1-6.

(Continued)

*Primary Examiner* — Ryan M Gray
(74) *Attorney, Agent, or Firm* — Drinker Biddle & Reath LLP

(57) ABSTRACT

A method on a first mobile device is described. Information is received that includes i) location information for a second mobile device at a geographical location proximate to the first mobile device, and ii) user information selected by a user of the second mobile device. An image location is determined, within an image, that indicates a relative location of the second mobile device based on an orientation of the first mobile device and the location information for the second mobile device. The image is augmented to include a visual identifier that corresponds to the second mobile device at the image location. The augmented image is displayed.

16 Claims, 19 Drawing Sheets

(56) References Cited

U.S. PATENT DOCUMENTS

| | | | |
|---|---|---|---|
| 2007/0050129 A1* | 3/2007 | Salmre | G01C 21/20 |
| | | | 701/408 |
| 2007/0281690 A1 | 12/2007 | Altman et al. | |
| 2008/0132251 A1* | 6/2008 | Altman | G06Q 30/0207 |
| | | | 455/457 |
| 2008/0248815 A1* | 10/2008 | Busch | H04W 4/02 |
| | | | 455/456.5 |
| 2010/0216491 A1* | 8/2010 | Winkler | G06Q 10/10 |
| | | | 455/457 |
| 2010/0280904 A1 | 11/2010 | Ahuja | |
| 2012/0030193 A1 | 2/2012 | Richberg et al. | |
| 2012/0063367 A1 | 3/2012 | Curtis et al. | |
| 2012/0150970 A1 | 6/2012 | Peterson et al. | |
| 2013/0142384 A1* | 6/2013 | Ofek | G06K 9/00771 |
| | | | 382/103 |
| 2013/0239019 A1* | 9/2013 | Pike | H04L 51/04 |
| | | | 715/753 |
| 2014/0063058 A1* | 3/2014 | Fialho | G06T 11/60 |
| | | | 345/633 |

OTHER PUBLICATIONS

Campbell et al., "Demo Abstract: Transforming the Social Networking Experience with Sensing Presence from Mobile Phones", SensSys '08,Raleigh, North Carolina, Nov. 5-7, 2008, 2 pages.

Yang et al., "E-SmallTalker: A Distributed Mobile System for Social Networking in Physical Proximity", 2010 IEEE 30th International Conference on Distributed Computing Systems (ICDCS), Jun. 21-25, 2010, pp. 468-477.

"Is He Cheating on You?", New York Post <http://nypost.com/2013/07/14/mobile-dating/>, Jul. 14, 2013, 4 pages.

\* cited by examiner

COMMUNICATION SYSTEM AND METHOD

CROSS-REFERENCE TO RELATED APPLICATION

This Application claims the priority benefit of U.S. Provisional Patent Application No. 61/917,249 entitled "Communication System" and filed on Dec. 17, 2013, which is hereby incorporated herein by reference in its entirety.

TECHNICAL FIELD

The present disclosure is related generally to a communication system for electronic devices and, more particularly, to sending user information between electronic devices.

BACKGROUND

In the digital age, including smart phones, tablets, social networks, and wearable technology, humans have become accustomed to remote relationships. Mobile technology has made it such that people walk around with their eyes on a screen and interact increasingly via a digital world. People connect on a digital level, sometimes without ever meeting in real life. Phrases such as "friend request sent," "Bill has invited you to connect" and "now following" etc. are commonly understood in the digital world as a means of establishing a relationship, whether it be professional, romantic, or social. But is this truly a relationship built between two people? Some would argue it is simply a connection maintained by cyberspace. In many cases, direct contact has been supplemented, to a certain degree, by socialization in the digital world.

The digital age has changed the relationship landscape. Friends can include a high school geometry partner or a long since spoken to childhood friend. Connections can be made with 3rd degree professionals. Followers can encompass people, groups, or causes that exist halfway across the globe. The existence of this non-living relationship is a defining characteristic of the digital world. While some personal connections are first made in the digital world, some people are digitally connected without having spoken in real life. Friendships, in a digital sense of the word, can persist for years without living world contact. Smart digital technology is supplementing, and often replacing, inter-personal skills, making it possible for relationships to exist in the digital world from conception.

Despite their differences, digital and living relationships share a key characteristic: both are founded on commonalities between people. This can mean a mutual friend, business partner or a similar interest or like. Online tools and other applications simply map out these commonalities between people. These applications are beneficial. They help make connections to grow business, spread news, foster relationships, and let people share. They do so by allowing people to manage their persona presented to strangers in the digital space. However, the potential for connection in real life is far greater. Research has shown that people are more inclined to start a conversation with a stranger if they know they have something to talk about. If a common topic of interest were provided, connectivity could increase dramatically.

The emerging 20-somethings generation include leaders of the Millennial force. As they age, the will begin to define the body of society. This marks a significant shift in the type of people that populate the world. The future generations use tablets as an extension of their hand and thrive in this world of connectivity. Social media fulfills a user's desire to quantify a number of likes, friends, comments, or connections. As a product of managing how friends, followers, or connections see them digitally, Millennials could find use for a way to control how people in their immediate surroundings see them in real-time. One point is that people inherently like to control their image. People demand choices such as how to dress or choosing a profile picture, but only because they are given those choices in the first place. People are drawn to tools that allow them to further design & define themselves, online and in real life.

SUMMARY

In an embodiment, a method on a first mobile device is described. Information is received that includes i) location information for a second mobile device at a geographical location proximate to the first mobile device, and ii) user information selected by a user of the second mobile device. An image location is determined, within an image, that indicates a relative location of the second mobile device based on an orientation of the first mobile device and the location information for the second mobile device. The image is augmented to include a visual identifier that corresponds to the second mobile device at the image location. The augmented image is displayed.

In another embodiment, a method on a first mobile device is described. First shared user information provided by a user of the first mobile device is received. One or more first information elements are generated that correspond to the first shared user information. First location information that indicates a geographical location of the first mobile device and the one or more first information elements are sent to a remote server. A response to the geographical location and the one or more first information elements is received from the remote server. The response includes i) second location information that indicates a geographical location of a second mobile device, and ii) one or more second information elements that correspond to second shared user information provided by a user of the second mobile device. An image is augmented to include a visual identifier that corresponds to at least one of the second information elements based on the second location information. The augmented image is displayed.

In yet another embodiment, an apparatus is described. The apparatus includes a processor, a display, a non-transitory memory, and a network interface device. The processor has one or more integrated circuits configured to: receive information that includes i) location information for a second mobile device at a geographical location proximate to the first mobile device, and ii) user information selected by a user of the second mobile device, determine an image location, within an image, that indicates a relative location of the second mobile device based on an orientation of the first mobile device and the location information for the second mobile device, augment the image to include a visual identifier that corresponds to the second mobile device at the image location, and display the augmented image on the display.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
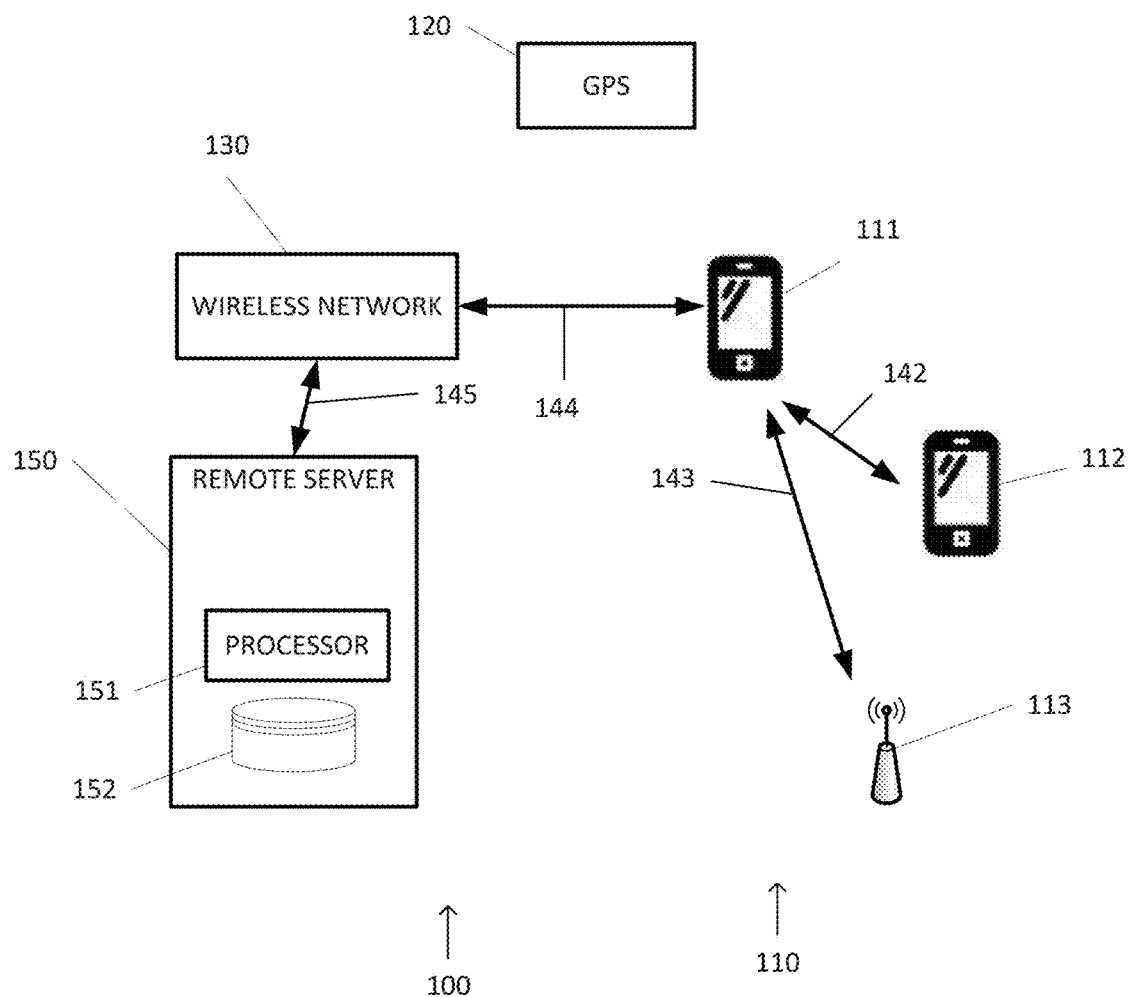
FIG. 1 is a block diagram illustrating a communication system that includes a plurality of electronic devices, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Throughout the paper, the words "digital world" will be used frequently. The term acts to encompass a person's online life including, but not limited to, social media networks, online modes of communication as well as provided services such as texting or use of apps. Likewise, the term "living world" may be an all-encompassing phrase to distinguish a person's time spent apart from the digital world. For example, face-to-face conversations and other person-to-person interactions in real life are part of a person's "living world."

Various embodiments described herein provide a communication system that allows a user to influence local impressions and catalyze conversations in the living world by using a mobile application. User information in some embodiments is separated into information elements. One or more selected information elements are displayed to other users and appear as "floating" icons or visual identifiers in the vicinity of the user. In some embodiments, such as with a heads-up display, the visual identifiers are broadcast by a mobile device, transmitter, personal digital assistant, wearable electronic device, or other electronic device and displayed such that they appear similarly to a hologram. Each icon corresponds to an information element that a user wishes to communicate or display about himself, such as a recently read book, a job position, a favorite brand or sports team, a concert ticket the user has for sale, or other information.

In various embodiments, the visual identifiers of the communication system are interactive. For example, a user selects the icon using his electronic device and additional user information, such as a personalized message, is displayed by the electronic device. With respect to the examples given, the additional message may include a short opinion on the book, a description of job responsibilities, a link to a favorite brand commercial, a picture of a favorite sports player, or a listed price for a ticket. Various embodiments allow a user to view more than another user's physical body—the user sees an extension of their persona as indicated by the visual identifiers. The user may control both the contents and permissions of the identifiers using a digital interface, such as a mobile application or web interface. The communication system thus could act as a catalyst for living relationships, interpersonal connections, and facilitate consumer-brand relations grounded in a common goal, interest, or desire. The communication system may further help strangers find commonalities of interest, business, friendship, or romance primarily through a living connection and secondarily through a digital connection.

As established previously, commonalities provide a spark to personal connection. One goal of managing an online profile is to present a "digital image" or persona of oneself in a certain light, so as to further define oneself, find commonalities and learn about others. The communication system described herein allows users to manage the personas they present to others in the living world and simultaneously helps people find living world commonalities in a real-time, local environment to promote user connectivity.

Figure 2:
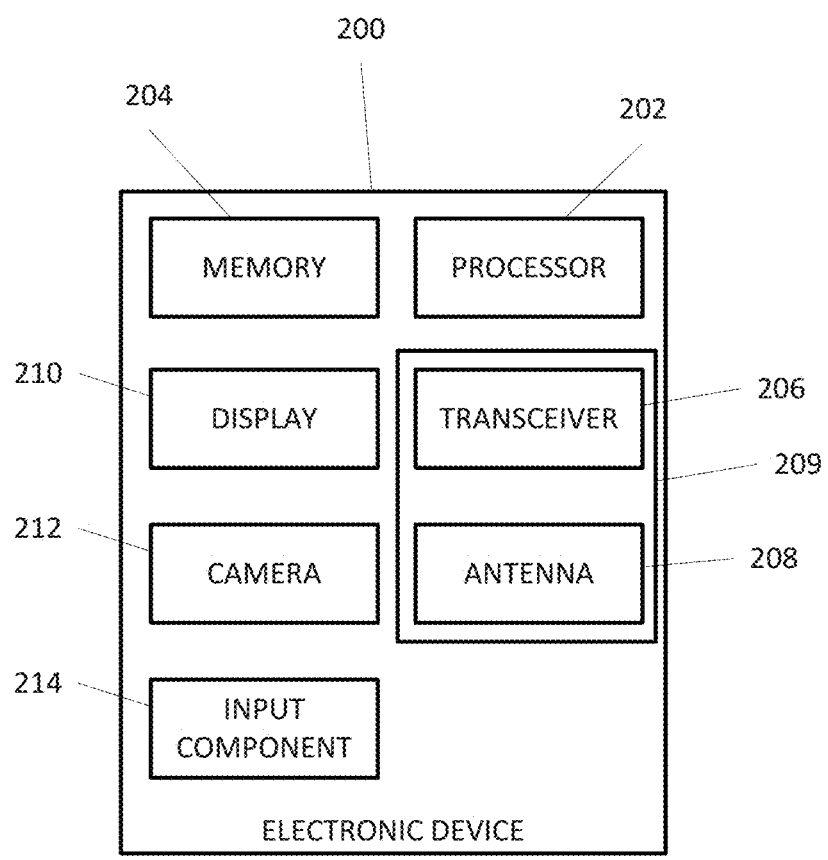
FIG. 2 is block diagram of one implementation of the electronic device of FIG. 1, according to an embodiment.

Turning to FIG. 1, a communication system 100 for providing user information is shown, according to an embodiment. The communication system 100 includes a plurality of electronic devices 110. Possible implementations of the plurality of electronic devices 110 include a mobile phone, smartphone, laptop, tablet, wireless wristwatch, wearable electronic device, wireless or electronic glasses, personal digital assistant, transmitter, or other electronic device. In other embodiments, the plurality of mobile devices 110 includes a wearable, handheld, or portable electronic device (not shown) capable of providing a "heads-up display" or optical head-mounted display, such as a pair of wireless-enabled glasses or computing contacts. As shown in FIG. 1, the plurality of electronic devices 110 includes mobile device 111, mobile device 112, and transmitter 113 as instances of electronic device 200 (FIG. 2). For simplicity, the electronic device 200 will be referred to herein, but it will be apparent to those skilled in the art that the communication system 100 can include multiple instances of the electronic device 200, in same or different configurations or implementations.

The electronic device 200 in some embodiments is configured to receive communications from a satellite-based positioning system 120, such as the global positioning system ("GPS"). Other implementations of the satellite-based positioning system 120 include the Globalnaya Navigatsionnaya Sputnikovaya Sistema ("GLONASS"), BeiDou Navigation Satellite System, Galileo navigation system, and Indian Regional Navigational Satellite System.

The electronic device 200 is configured to communicate with a wireless network 130, in an embodiment. Possible implementations of the wireless network 130 include a cellular network, Institute of Electrical and Electronics Engineers ("IEEE") 802.11 network, or other suitable wireless communication network.

In some embodiments, the communication system 100 includes a remote server 150. Possible implementations of the remote server 150 include a web server, profile server, or database server. In another embodiment, the remote server 150 is a cloud-based server. The remote server 150 includes a processor 151 and memory 152, in an embodiment.

Turning to FIG. 2, a block diagram illustrates the electronic device 200 according to an embodiment. The electronic device 200 in one example implements one or more of the electronic devices 110. As shown in FIG. 2, the electronic device 200 includes a processor 202 that executes stored programs. The electronic device 200 further includes a memory 204. The processor 202 writes data to and reads data from the memory 204. In one example, the electronic device 200 is configured with an application, such as a preconfigured or downloadable mobile "app," to provide one or more portions of the features described herein.

The electronic device 200 also includes a radio transceiver 206 and antenna 208 that provide a network interface device 209 configured for sending and optionally receiving data, for example, over a wireless network (e.g., the wireless network 130 of FIG. 1) or with other electronic devices (e.g., via a wireless communication link). In some embodiments, such as a transmitter in a fixed location or with a fixed identifier (e.g., the transmitter 113), the electronic device 200 does not generally receive data from other electronic devices, for example, to reduce power consumption or cost of manufacture. Other embodiments of the transmitter 113 may receive data.

In a further example, the radio transceiver 206 and antenna 208 are configured for receiving communications from a satellite-based positioning system (e.g., the satellite-based positioning system 120 of FIG. 1). The electronic device 200 in this case uses positioning data such as GPS data from the satellite-based positioning system 120 to determine its current location. In another embodiment, the electronic device 200 determines its current location based on data received via the wireless network 130 or other instances of the electronic device 200 (e.g., from another mobile device or transmitter).

In some embodiments, the electronic device 200 has a display 210 that may include one or more of a display screen, touch screen, liquid crystal display ("LCD"), or the like. The electronic device 200 may further include a camera 212 or other image or video capture device. The electronic device 200 may further include an input component 214, such as one or more buttons, touch-sensitive inputs (e.g., a touch-screen display or capacitive sensor), keypads, or the like. In some embodiments, the input component 214 includes an eye movement sensor configured to detect movement of the user's eye (e.g., looking up, looking down), blinking, squinting, or other eye movements. The electronic device 200 in one example interprets the eye movements for navigation of menus, selection of items, movement of a cursor, or other user interface actions, as will be appreciated by those skilled in the art. In other embodiments, the input component 214 includes a microphone. In this case, the electronic device 200 may be configured to recognize sounds, speech, or other audio commands. In alternative implementations, various components of the electronic device 200 may be combined or divided. For example, the radio transceiver 206 or antenna 208 may be separated into a plurality of components for separately handling GPS, Bluetooth™, 802.11, and cellular communications. Alternatively, the radio transceiver 206 may be configured as a combined radio transceiver for multiple wireless communication protocols or links.

Some embodiments of the electronic device 200, such as the mobile device 111 and 112, are configured to receive wireless communications. In one example, the electronic device 200 is configured to establish a wireless communication link to receive the wireless communications. As shown in FIG. 1, the mobile device 111 has wireless communication links 142, 143, and 144 established with mobile device 112, transmitter 113, and wireless network 130, respectively. Possible implementations of the wireless communication links 142, 143, or 144 include a Bluetooth™ link, IEEE 802.11 link, IEEE 802.15 link, cellular link (e.g., Device-to-device communication), other radio frequency ("RF") communication link, infrared communication link, or other wireless communication link. In other implementations, the electronic device 200 does not establish a wireless communication link with another device, but simply "listens" for incoming data from other devices, such as data that is broadcast from another device. In this case, the electronic device 200 may listen for broadcast data continuously, upon receipt of a message, at a requested time (i.e., on demand), or at pre-selected times, such as a time received in a message or on a schedule for the electronic devices 200 of the communication system 100.

The electronic device 200 is configured to send data, such as user-selected identifiers, to other electronic devices 200 or to the remote server 150. The electronic device 200 may send data directly, such as through the wireless communication links 142, 143, or 144. In another example, the electronic device 200 sends data indirectly or through one or more intermediaries, such as to the remote server 150 via the communication link 144 and a communication link 145. In other implementations, the electronic device 200 may send data via one or more other electronic devices, such as in an ad hoc network. For example, the transmitter 113 may send data to the mobile device 111, which then sends the data to the mobile device 112. In yet another example, the electronic device 200 broadcasts data with an established wireless communication link. The electronic device 200 may send identifiers upon receipt of a message (e.g., a discovery request from another electronic device), upon a status change or event, or at pre-selected times, such as a time received in a message or on a schedule for the electronic devices 200 of the communication system 100.

The electronic device 200 may send identifiers along with a media access control (MAC) address or other suitable information for identification of the electronic device 200. Use of the MAC address allows for privacy of other user-identifiable information, such as the user's real name. The electronic device 200 in one example uses locations associated with the identifiers for geo-fencing. In this case, the electronic device 200 may filter the display of identifiers based on their location. In one case, the electronic device 200 filters the display to show only those identifiers within one or more predetermined geographic areas or locations, for example, a town, restaurant, shopping mall, tourist attraction, or other location of interest. In another case, the electronic device 200 filters based on a current location or orientation of the electronic device 200, for example, within a predetermined distance (e.g., 10 meters) or within line of sight (e.g., based on visual range, obstructions due to buildings, or the direction in which the user or electronic device 200 is facing). In an embodiment, the electronic device 200 provides one or more user-selectable values for defining an "immediate vicinity" of the electronic device 200 for filtering based on proximity, such as a distance value, signal strength indication, or other suitable value. In one such embodiment, the immediate vicinity corresponds to an area within a geo-fence. In another case, the electronic device 200 filters based on selected demographic identifiers such as, but not limited to, gender and age. The electronic device 200 may use Bluetooth (e.g., Bluetooth Client procedures), cellular, or other protocols for discovering MAC addresses within proximity to the electronic device 200.

The communication system 100 is configured to promote communication of user information of one user, such as interests, desires, ideas, or opinions, to other users with their own corresponding user information (e.g., shared or related interests). The communication system 100 in one example displays the user information as identifiers or icons that represent the user information. By allowing users to display identifiers of interest to them, we see we have more in common with person across the room than we think. The communication system 100 allows a user's interest and connections in the digital world to be more easily discovered in real life.

The identifiers in one example are permission-based augmented reality identifiers. The communication system 100 allows the user to select which identifiers are displayed or made available to other users. The communication system 100 may further allow the user to place restrictions on users that may view, display, or otherwise access their identifiers.

The communication system 100 allows users to host or "anchor" one or more identifiers that they select. The identifiers in one example are provided or displayed as an icon or other image. The users may select identifiers based on their interests, thoughts, ideas, desires, goals, events, or other criteria. The identifiers act as a universal language and help people see commonalities they share with other people, as well as preemptively learn about those around them. In some implementations, such as an application for a smartphone or tablet, the identifiers are interactive or "clickable," which allows a user to provide additional user information about themselves and their identifier to be viewed by other users.

The electronic device 200 in one example displays or superimposes the identifiers near a corresponding user when viewed through a mobile device or heads-up display. In this case, an icon may appear to "float" near the corresponding user. Hereafter, identifiers will be referred to as a "booie."

The communication system 100 connects users based on booies that are "anchored" or hosted via the electronic device 200.

The electronic device 200 provides user-selectable permissions that affect which users can access booies anchored by the electronic device 200. For example, a user of the electronic device 200 may not wish to share their booies with other users under the age of 21 or with other users who have a booie for a rival sports team. Users may manage the contents and permissions of their own identifiers or information via the electronic device 200. Users may also manage filtering of other user's identifiers or information.

In one implementation, the electronic device 200 hosts booies for the user and the hosted booies are not accessible from outside sources, such as a profile server. In this implementation, booies are not "matched" by the profile server but simply displayed to other users nearby (e.g., within communication range of the transceiver 206). In this embodiment, once two electronic devices 200 have moved outside communication range, the other device may be "forgotten."

Identifiers/Booies

The user may select one or more identifiers from an identifier set. The selected identifiers are then available to be accessed (subject to permissions or filtering, as described herein) by other users of the communication system 100. In an embodiment, the identifier set includes identifiers that have been previously approved by a manager or operator of the communication system 100. In another embodiment, the identifier set includes identifiers that are included within one or more predetermined categories. As one example, the predetermined categories include an offer category, a share category, and an answer category.

In some embodiments, the communication system 100 provides predetermined categories for an identifier which the user may then customize and "float" for display to other users. For example, through the offer category for a business to consumer (B2C) interaction, an offering party (e.g., a business or organization) selects an offer booie and inserts text, images, or other information to indicate a discount, coupon, or other suitable information. In an embodiment, the communication system 100 sends a push notification that provides the offer booie to one or more users. In some embodiments, the users to receive the push notification are selected by the business through a user interface. In other embodiments, the communication system 100 selects the users based on user preferences, interests, active booies, or other suitable criteria. In another embodiment, the offer category is used by an individual to offer a concert ticket to other individuals for a consumer to consumer (C2C) interaction.

The communication system 100 in some embodiments is used for social, professional, commerce, marketing or advertising, gaming, or other suitable purposes. In various embodiments, some identifiers within the identifier set are categorized or grouped into one or more subsets based on those purposes (i.e., social identifiers, marketing identifiers). In some embodiments, identifiers are related to one or more of academics, sports, companies, politics, books, film, sales, or other areas of interest. Identifiers may also be categorized based on other social, educational, or corporate systems. For example, a college campus may have identifiers or identifier groups for performances, speakers, parties, sports events, student unions, campus recreation, food, Greek events, philanthropy, or other campus events.

Figure 3:
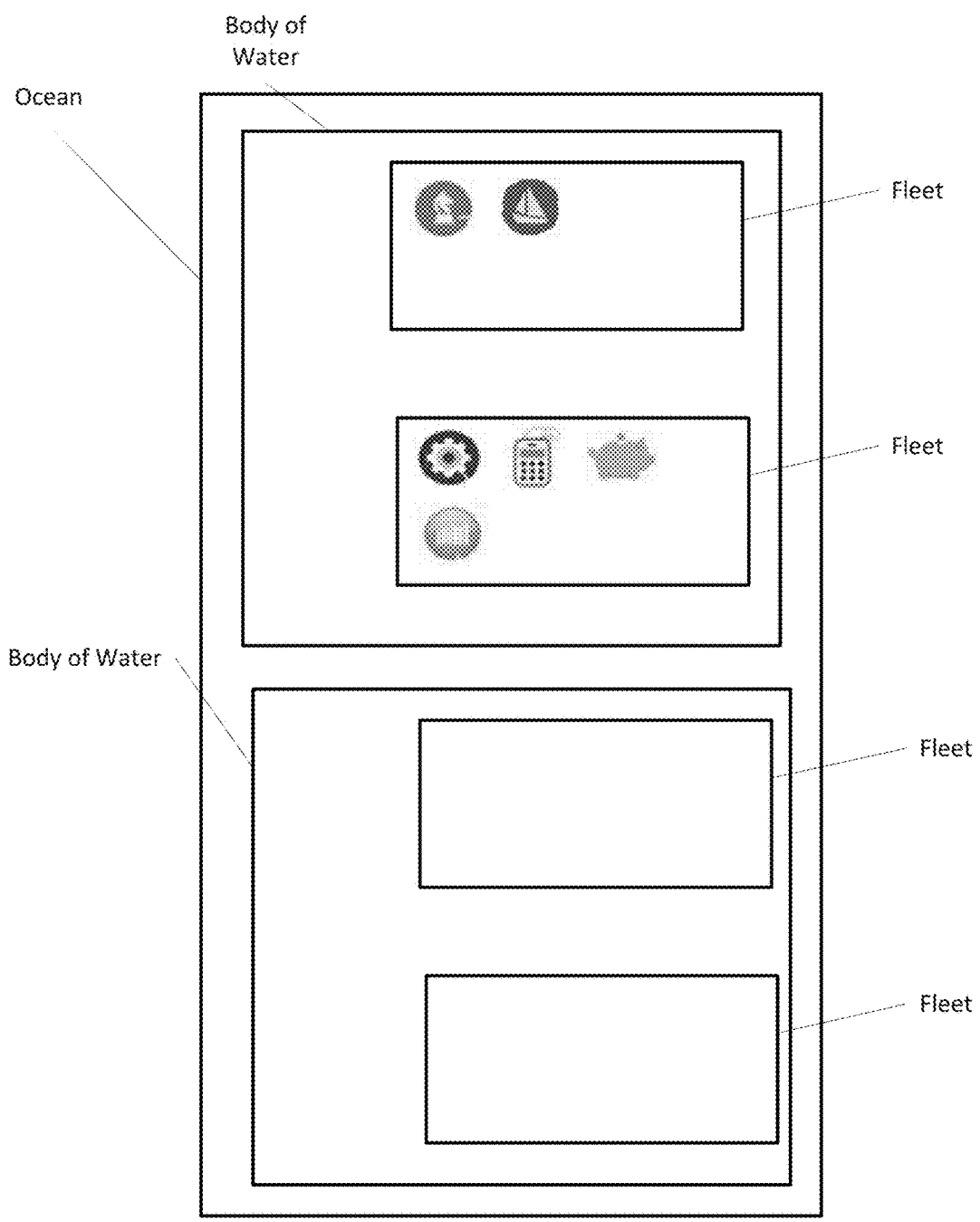
FIG. 3 is a block diagram illustrating a hierarchy of identifiers for the communication system of FIG. 1, according to an embodiment.

Turning to FIG. 3, organization of the identifiers or booies in one example is hierarchical. For example, the "Ocean"

may be a top-level category or "container" for all available booies in the communication system 100. A "body of water" may be a sub-category of the Ocean and may represent, for example, specific geographical regions (e.g., North America, United States, Chicago, Wrigleyville), or user types (e.g., individual user, corporate user, minor user).

Booies within a body of water may be organized into "Fleets." A fleet is a collection of booies sharing an underlying similarity in function. For example, booies in a "Professional Fleet" may include booies related to skills, job positions, education, work experience, or other professional characteristics. Booies in a "Social Fleet" may include of interests, activities, events, hobbies or passions—more specifically—news articles, videos, books, movies, TV shows, trending DIY, recipes, etc. Booies in a "Merchant Fleet" may include a buyer booie, seller booie, or other booies associated with merchandise or products for sale. Further levels of hierarchy may also be used. In some implementations, the hierarchy categories have corresponding booies. One example of a hierarchy, in descending order, includes a Social booie, Sports booie, Baseball booie, Baseball Team booie, and team player booie.

Referring to FIG. 3, a Social Fleet is shown with Chess and Sailing booies and a Professional Fleet is shown with engineering, accounting, banking, and marketing booies. Alternative implementations for organization of booies will be apparent to those skilled in the art. In some implementations, a booie may be associated with a single fleet or with a plurality of fleets.

Creation of Identifiers

While many examples of identifiers have been described, one or more of the electronic device 200 or remote server 150 in one example provide a user interface for creation of new identifiers (i.e., not contained within a predetermined category). The user interface may be implemented as a web or mobile application. In one case, a user wishes to create an identifier for a local sports club. The electronic device 200 may receive one or more of information for the identifier, a selected icon or graphic for the identifier, or a custom icon for the identifier. The electronic device 200 may also provide a user interface for setting user-selectable permissions for the identifier. In this case, the user who creates the identifier (or other users designated by that user) may restrict other users from hosting the booie, for example, based on the above-mentioned filters.

In order to allow users to personalize booies based on a given community (i.e. a college campus, a town, city, etc. with respect to landmarks, local businesses, events, etc.) users can submit a booie for approval. The electronic device 200 is configured to allow a user to take a photograph of a location, building, or figure and use artistic features of the application (e.g., insert text, change colors, insert lines or other graphic elements) to make their vision come to life as a booie. Booies may be created for specific events. In some implementations, before a user-created booie is released for anchoring by other users, the booie must be approved by an operator or manager of the communication system 100. In this case, the user-created booie may be censored or screened for inappropriate content, business ventures, or other criteria while pending acceptance (i.e., before display to other users) and/or retroactively (i.e., displayed and subsequently censored after review by the operator or manager). In some embodiments, identifiers within the predetermine categories (i.e., share, offer, and answer booies) are screened retroactively. In one example, booies related to business, commerce, or other ventures may be submitted as a booie (e.g., as a brand-name booie) for a fee. The fee may be on a per use basis, per creation basis, or time period basis (e.g., use for one day, use for one year).

Permissions

The electronic device 200 allows a user to choose which identifiers are displayable to other users and to whom those identifiers are visible. A user can choose to be offline from the communication system 100 if they do not wish to anchor a booie. In this way, the display of booies is permission based. The user interface of the electronic device 200 allows the user to set permissions for how booies are sent, such as whether they are sent directly, indirectly, or re-broadcasted by other devices. The user interface also allows the user to restrict permission to selected identifier groups, user-created groups, or other criteria.

The user interface allows the user to go offline by "Jumping Ship"—user looks normal, as if they do not have the application downloaded and they are considered offline. Additionally, the user interface may allow a user to indicate that they have become idle (e.g., not actively using the user interface). The user interface may also provide a "climb aboard" icon as users are logging in or configuring their booies to be displayed. Booies displayed can also be configured to automatically update during a predetermined time period (e.g., 24 hours) or upon a requested refresh. In some embodiments, the electronic device 200 provides a configuration menu for the user to select a refresh period or schedule.

Viewing Identifiers

Figure 4:
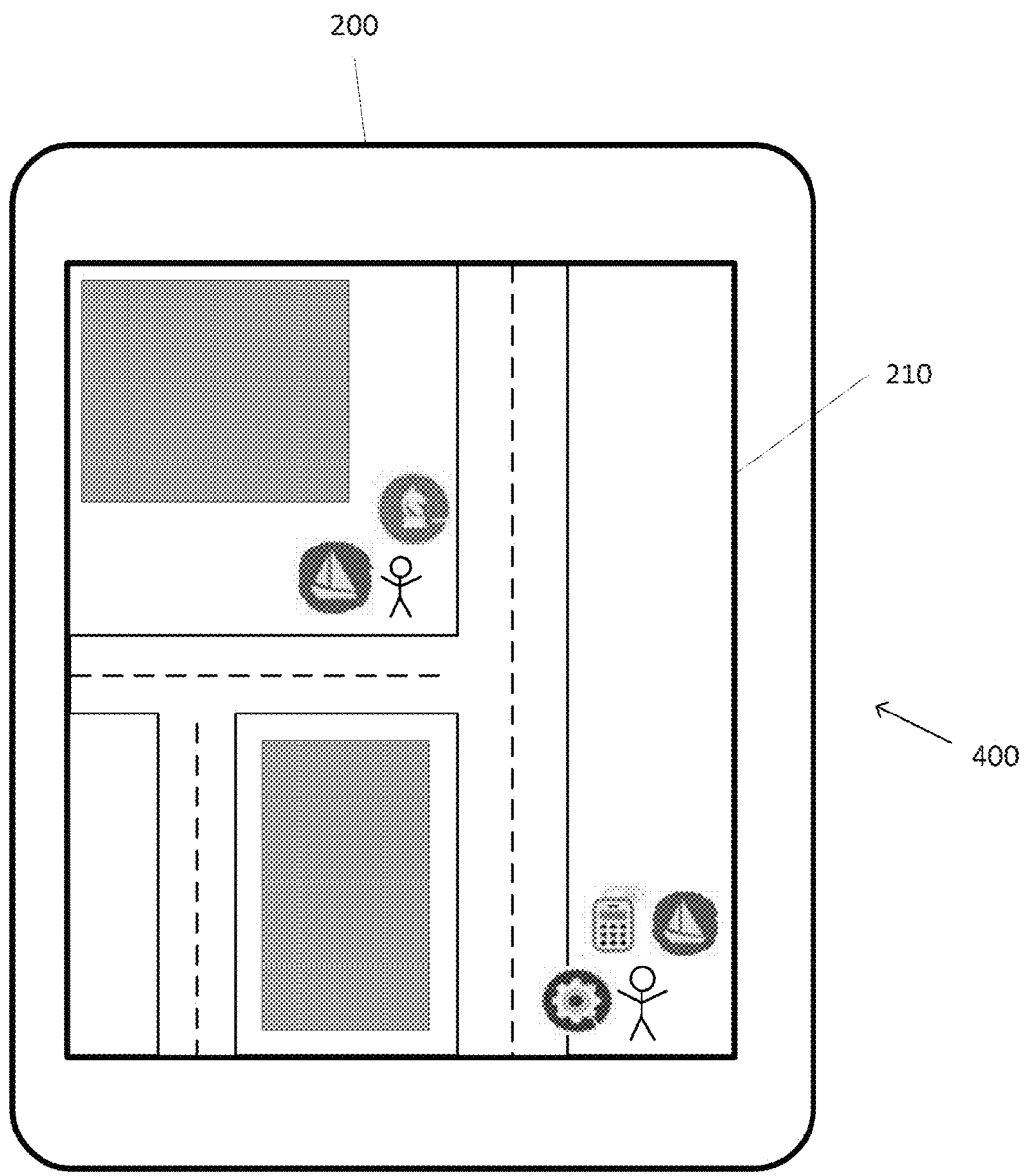
FIG. 4 is a view of a map screen with identifiers superimposed thereon, according to an embodiment.

Turning to FIG. 4, the electronic device 200 in one example provides a user interface 400 on the display 210. The user interface 400 allows interaction with a visible booie to view additional user information, as described above. The user interface 400 may include a two-dimensional display or a three-dimensional display, such as a map, captured image, or virtual environment. The 2D/3D map function allows a user to scan their surroundings using the electronic device 200. Locations of other users are displayed with respective booies around them. In one example, a user is displayed as an anchor with that user's booie attached to the anchor. The user interface 400 also allows the user to select filters to show only desired users or booie.

As shown in FIG. 4, the user interface 400 is a top-down or two-dimensional map. In this case, the booies of other users are shown relative to a location of the corresponding user. The electronic device 200 in one example uses positioning data (e.g., GPS data) for placing the booies on the map. The electronic device 200 in one example displays the booies and/or a background as an overlay on a map provided by a third party, such as a local or regional map from Google Maps or MapQuest. The user interface 400 allows a user to zoom in or out on the map. In some embodiments, the map is at least partially hidden with a gradient overlay to provide a perspective view to the user. In an embodiment, the user interface 400 displays the map as an "immediate world" view (e.g., within the immediate vicinity of the electronic device 200) and/or a "bird's eye" view. In an embodiment, the bird's eye view provides a graphical representation of where the immediate world view exists with respect to the map, as described below with respect to FIG. 11. The immediate world view provides a graphical representation of which users and/or booies are in their immediate vicinity, as described below with respect to FIG. 12.

Figure 5:
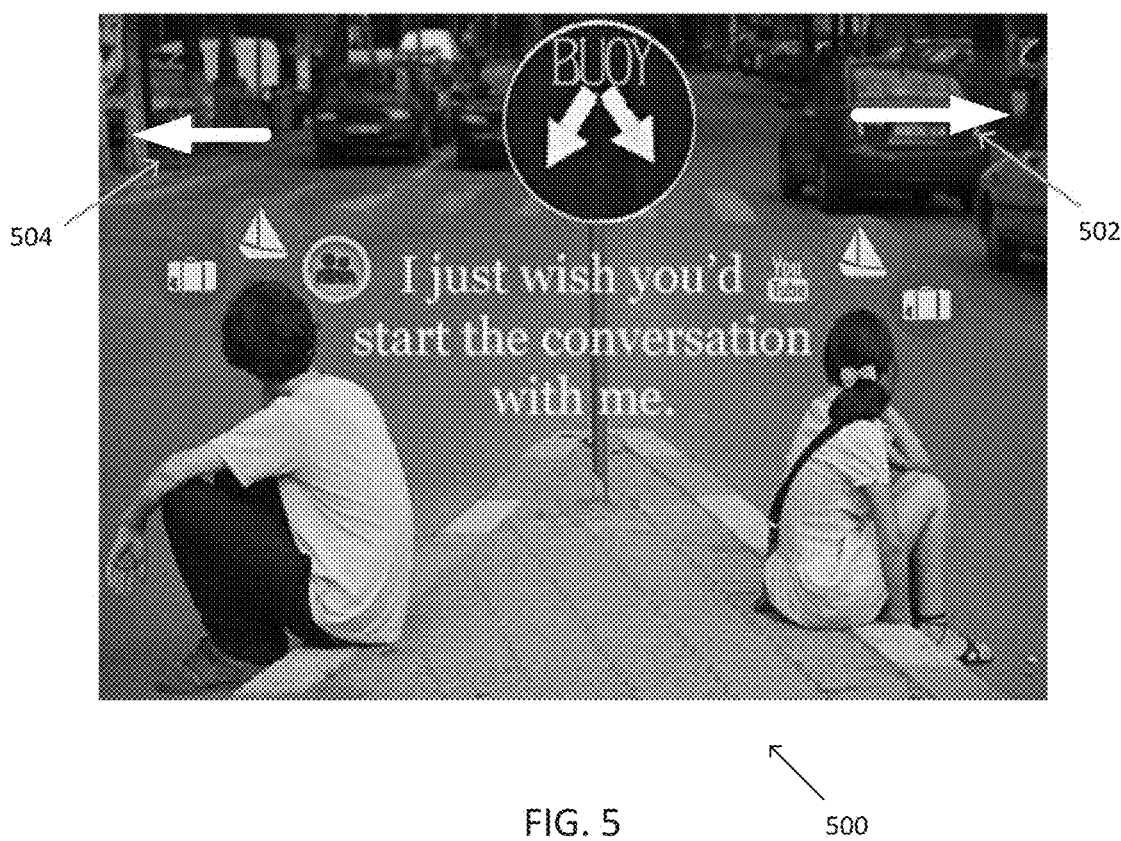
FIG. 5 is a view of an image with identifiers superimposed thereon, according to an embodiment.
Figure 6:
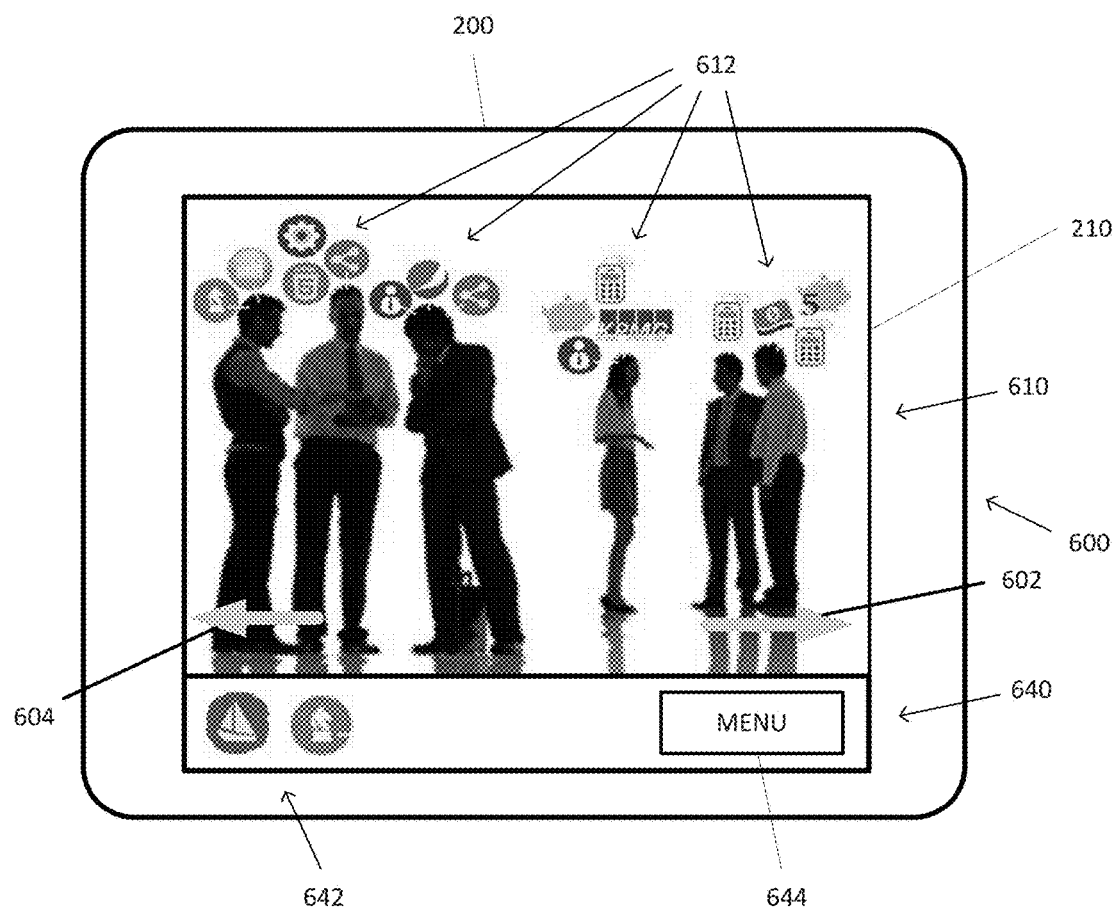
FIG. 6 is another view of the electronic device of FIG. 1 illustrating a first person display with identifiers superimposed thereon, according to an embodiment.

Turning to FIG. 5 and FIG. 6, the electronic device 200 in another example provides the user interface on the display 210 as an "augmented reality" interface 500 or overlay 600 of an image (e.g., a still image or video from the camera 212). The augmented reality interface 500 and overlay 600 include identifiers or icons for those users who are viewable or identifiable in the image. The augmented reality interface 500 may be displayed when the electronic device 200 is a pair of wireless-enabled glasses, such as Google Glass, or communicatively coupled with another heads-up display. The augmented reality interface 500 or overlay 600 may further include one or more directional indicators 502, 504, 602, or 604 that indicate to the user which way he must look to see a selected booie.

The overlay 600 may be displayed when a user holds the electronic device 200 (e.g., a Smartphone or tablet) such that the camera 212 captures images of other users in a room or nearby vicinity. The electronic device 200 identifies other users in the image and determines whether those users have booies that are visible (e.g., based on permissions or filters).

When viewing a local scene through an instance of the electronic device 200 that provides the augmented reality interface 500 or overlay 600, users may be able to click and drag visible booies associated with another electronic device 200 to their screen for viewing the user's information in more detail. Referring to FIG. 6, the overlay 600 includes a viewing portion 610 and a menu portion 640. The viewing portion 610 includes identifiers 612 or "booies" displayed over a still image, live-view image, or video. The menu portion 640 may include an identifier area 642 and one or more buttons 644.

Figure 7A:
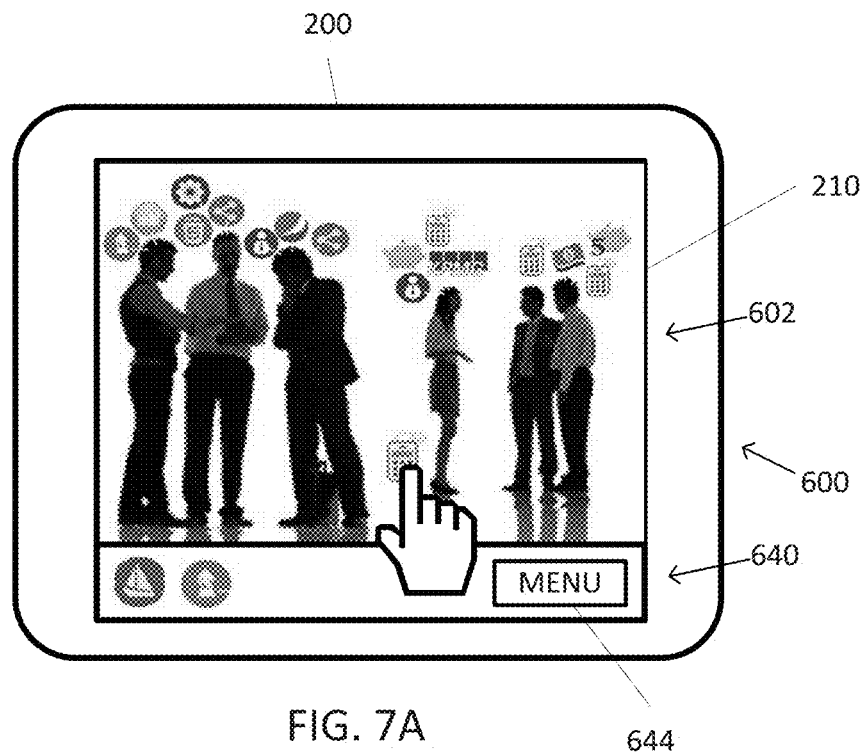
FIG. 7A and FIG. 7B are views of the electronic device of FIG. 6, further illustrating a drag and drop feature, according to an embodiment.
Figure 7B:
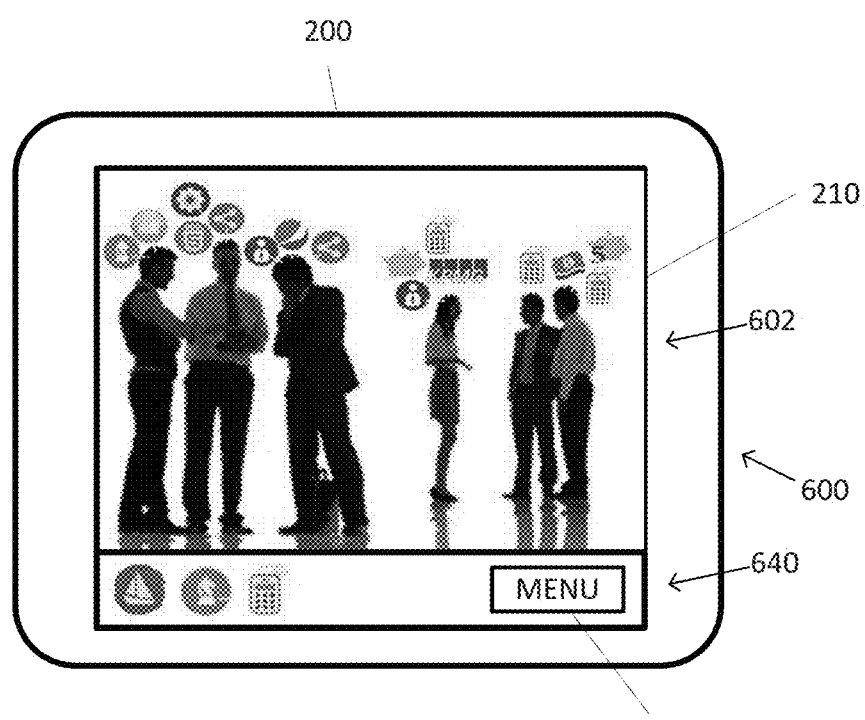

Turning to FIG. 7A and FIG. 7B, the electronic device 200 in one example allows the user to drag and drop identifiers. In this way, the electronic device 200 allows the user to select identifiers for viewing, placing in a queue, or adding to their own displayed identifiers. As shown in FIG. 7A, the user may use his finger, a stylus, or other indicator to "click and drag" an identifier into the menu portion 640, as will be appreciated by those skilled in the art.

Filtering Identifiers

The electronic device 200 provides filters for filtering booies that are displayed on the user interface 400. For example, the user may choose a filter for selected types, categories, specific booies, or criteria of booies they would like to see. In this case, a user may select a filter that allows only booies related to football teams, a specific television show, or online fan club to be displayed. Other filters affect which users have booies that are displayed. In this case, a user may select a filter that allows only those booies from users that are within an age range of 21-30 to be displayed. The electronic device 200 may also use geo-fencing based on GPS locations to filter booies within the immediate vicinity of the user or other demographic criteria. As one example, a user at a career networking event searching for a job in market analytics selects one or more filters to see a combination of a market analytics booie, a hiring booie, and a company booie. As another example in a social setting, a user interested in finding other users interested in talking about the World Cup would select a filter for a World Cup booie. In various embodiments, filtering is based on a combination of multiple booies, a single booie, certain types of booies, words or phrases associated with a booie, or other suitable criteria.

In one example, the electronic device 200 is configured for automatic filtering of booies. In this case, the electronic device 200 filters booies based on the hierarchy. For example, a booie for a favorite baseball player may be categorized under a Sports, Baseball, and Baseball Team, each with a different booie. As one example, a first user selects a booie for a Baseball Player A, which corresponds to a Baseball Team B booie, the Baseball booie, and the Sports booie. A second user selects a Baseball Player C booie which corresponds to the Baseball Team B booie, the Baseball booie, and the Sports booie. In this case, the first user may select a filter for the Baseball booie such that only booies within the Baseball category are displayed. However, the electronic device 200 automatically selects a booie within the Baseball category that most closely relates to the selected Baseball Player A booie, in this case, the Baseball Team B booie. This allows for a more simplified display with only a single, automatically selected booie instead of multiple booies that are related.

The user may select one or more booies to be displayed. A customized booie in one example exists in "limbo" (i.e., not displayed) until the booie has received approval from a manager or operator of the communication system 100. In some implementations, the electronic device 200 and remote server 150 do not keep a timeline, record, or history of booies that have previously been anchored. For example, booies are discarded after a user has removed them and thus only current booies selected by the user are displayed.

Example Use Cases

In one example, a user of the electronic device 200 anchors a booie for a topic as a point of entry into a conversation. For example, User A and User B are deboarding a plane and on their way to a baggage claim. Both users are going to the same hotel and would like to split a cab. User A sees User B has hosted a "split a cab" booie. User B clicks on the booie to drill down to User A's destination, provided by User A as additional user information. User B sees they are going to the same location and offers to split a cab to the hotel.

As another example, User A was recently relocated to Chicago from Winnipeg, Canada. He is having a hard time adjusting to the city. He has had difficulty finding a place where fellow curlers share a passion for the sport. User A hosts a Curling booie, which is seen by User B. User B is a member of the Chicago Curling Club and approaches User A while they are waiting for the subway. As they continue to talk about their shared passion, User B invites User A to visit the club the following Monday.

As yet another example, User A is a University of Illinois alum, they host a "U of I" booie at a bar. User B is also a University of Illinois alum hosting the Illini booie. User B sees user A's U booie and strikes up a conversation about the university.

Professional booies allow a user to host qualifications, open positions, skill sets, etc. to initiate a professional connection. As one example, User A and User B are participating in a networking event. User A is an human resources representative for Pepsi looking for a seasoned individual to fill an open strategic analyst's position. User B is an individual who has six years of analyst work in a large manufacturing company. User A hosts the HR and Pepsi icons in addition to the skill icons he/she is looking for in a candidate. User B sees user A's booie from across the room and makes a point to introduce him/herself.

Commerce booies allow a user to host a product for purchase or sale to help people engage in more efficient business transactions. In one example, User A is looking to purchase a Friday ticket to Lollapalooza. He/she is walking to work that Friday morning (so far unsuccessful in purchasing a ticket) and sees someone across the street with a ticket booie. User A clicks on the ticket booie to get further detail on the type of ticket and price. The details claim: "Friday Lollapalooza wristband, Price: $150." User A requests to join User B's crew and coordinates to meet at the street corner for immediate exchange, as described below with respect to FIG. 16.

Marketing/Advertising booies allow a user or company to hire individuals to be a "walking billboard" by hosting the company booie and corresponding details. In one example, an orthodontist offers a 5% discount to any patient who logs twenty public hours of his practices' booie. This acts as a referral discount. In another example, a company gives discounts to customers who host a branded product booie when they are wearing the company's clothes or using the company's products. A link for purchasing the product may be included in the user information of the branded product booie.

In some embodiments, the remote server 150 is configured to send push notifications via the wireless network 130 to the electronic device 200. In one example, an owner of a business or commercial establishment sends a push notification to a specific demographic group of users with a mobile device within range of the business. In another example, a business sends out push notifications offering a deal at a specific store location.

Gaming booies, such as for real-time local fantasy sports, allows users to host and trade booies of their favorite players. For example, each professional athlete is given a point value based on league stats. Beginners to the game are given a standard number of points that they can use to "purchase" players. Additional points may be purchased for a fee. Trading can occur in real-time based on players' agreement. In another embodiment, a gaming booie facilitates a real life interaction between users by encouraging the users to accomplish a task together. Examples of such tasks include word games, solving a riddle, playing a game, answering a trivia question, or other suitable games.

Booies may also be used for event management. As one example, The Entrepreneurial Foundation is hosting a conference in Atlanta, Ga. The group works with a booie client management team to create a collection of custom booies for attending entrepreneurs to use when at the conference. This would be a more specialized version of booie where attendees of an event would have booies for specific activities or talks such as specific speakers.

Instead of a mobile device, booies may be a transmitter located on or around an inanimate object or in a specific location. In this case, the booie provides fixed location branding. For example, the transmitter 113 may be placed outside or near a place of business, such as a restaurant. With location branding booies, companies can present icons in specific locations. For example, a booie could be anchored to an existing billboard, street sign, or other inanimate location such as the sidewalk. The booie could provide a link to media advertisements, websites, or other information to communicate a brand message to the user.

Figure 8:
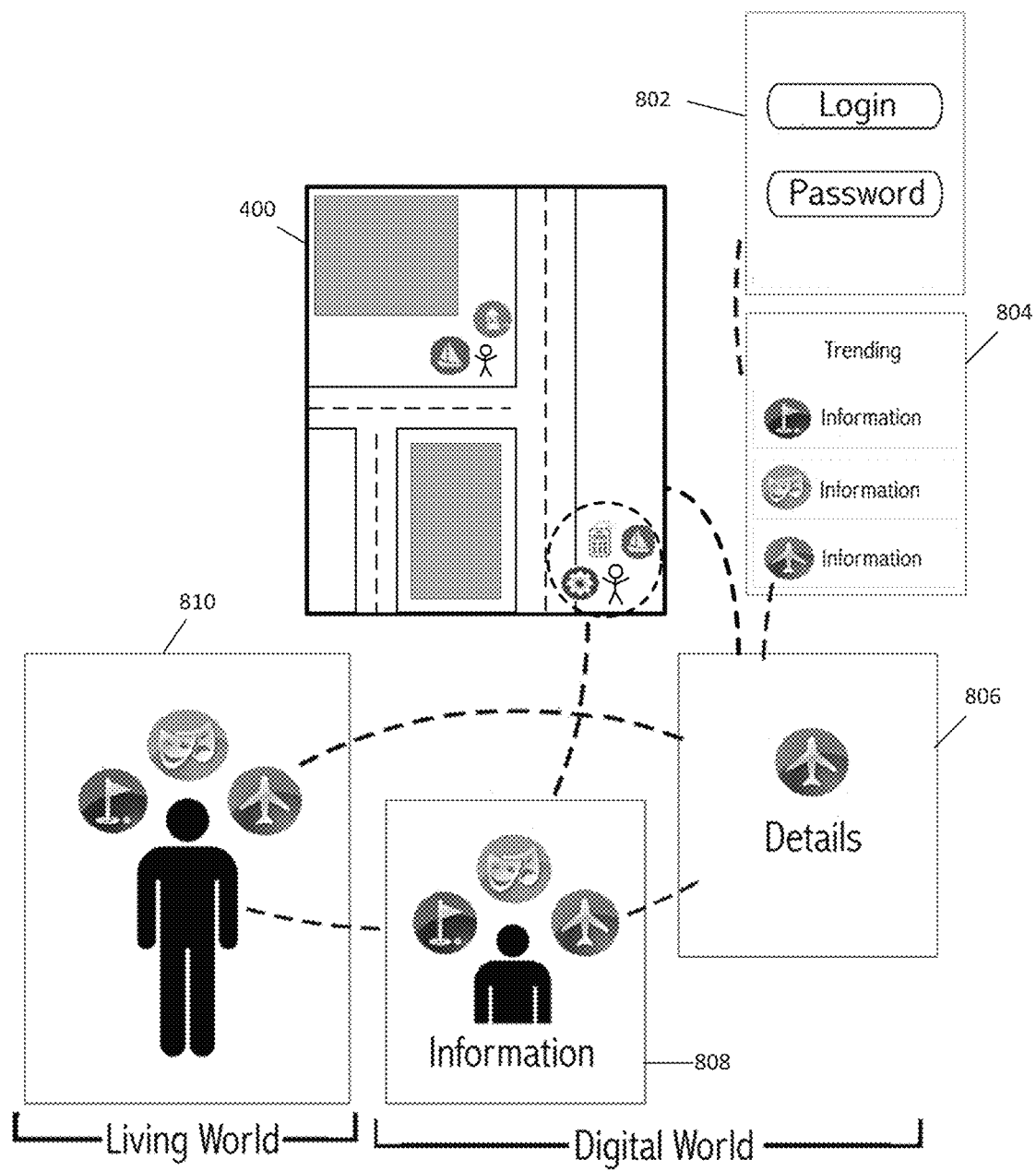
FIG. 8 is a diagram of user interface screens for the electronic device of FIG. 1, according to an embodiment.

Turning to FIG. 8, a plurality of user interfaces are shown as examples of screens that may be displayed by the electronic device 200. The user may first view a login interface 802. The user enters a login, such as a user name or e-mail address, along with a password to access the communication system 100. In some embodiments, the electronic device 200 displays a "trending" interface 804, for example, after the user has logged in or upon selection of a menu item. In the embodiment shown in FIG. 9, the trending interface 804 displays one or more trending, popular, or promoted booies within the immediate vicinity or adjacent area (e.g., a campus or city). In some embodiments, the electronic device 200 updates the trending interface 804 in real-time as updates are received from the remote server 150 or other electronic devices. The trending interface 804 is updated to show booies that represent popular activities, popular establishments, or the like based on other users or promotions within the adjacent area. In some embodiments, the popularity of a booie is calculated based on the number of times the corresponding booie has been hosted by different users. In this way, users in a local area may see the real-time trending events or activities in their environment. Access to a trending interface 804 may be restricted based on the login and password. In this case, a trending interface for university students may be limited to those students.

Figure 9A:
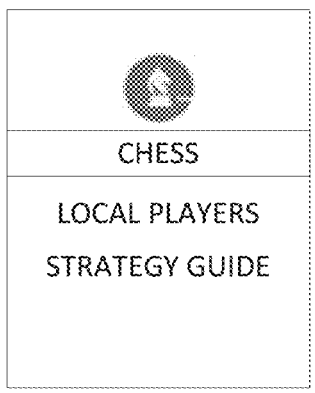
FIG. 9A and FIG. 9B are views of user interface screens for various identifiers of FIG. 3, according to an embodiment.
Figure 9B:
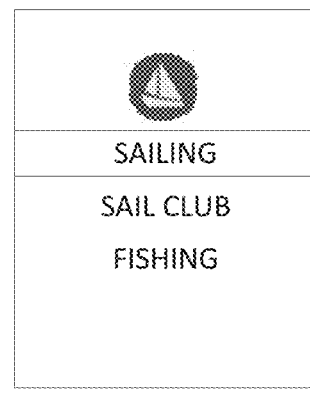

In some embodiments, the electronic device 200 displays a booie detail interface 806 that shows user information for corresponding booies. For example, upon selecting or clicking a booie from the trending interface 804 or other suitable interface, the electronic device 200 shows the booie detail interface 806 for the selected booie. Examples of booie detail interfaces 806 are shown in FIG. 9A and FIG. 9B. In one example, the booie detail interface 806 includes one or more links to other user interfaces, for example, to allow the user to see which users have hosted the corresponding booie.

In an embodiment, the electronic device 200 displays a user information interface 808, for example, when a user is selected from the user interface 400, when a link from a booie detail interface has been selected, or other suitable input has been received. The user information interface 808 displays one or more of the booies hosted by the corresponding user. In some embodiments, the user information interface 808 displays other user information provided by the user, such as a profile picture, age, or other suitable information. As shown in FIG. 8, a user may select an Airline booie from the trending interface 804 to view the corresponding booie detail interface 806 for the Airline booie. The user may then select a link to one or more users that are currently hosting the Airline booie to view that user's user information interface 808.

The electronic device 200 may display an augmented reality interface 810 upon selection of a user or booies. If the selected user is not currently visible or "in-frame", the electronic device 200 may display the directional indicators 502 or 504 to guide the user's view to the selected user.

Figure 10:
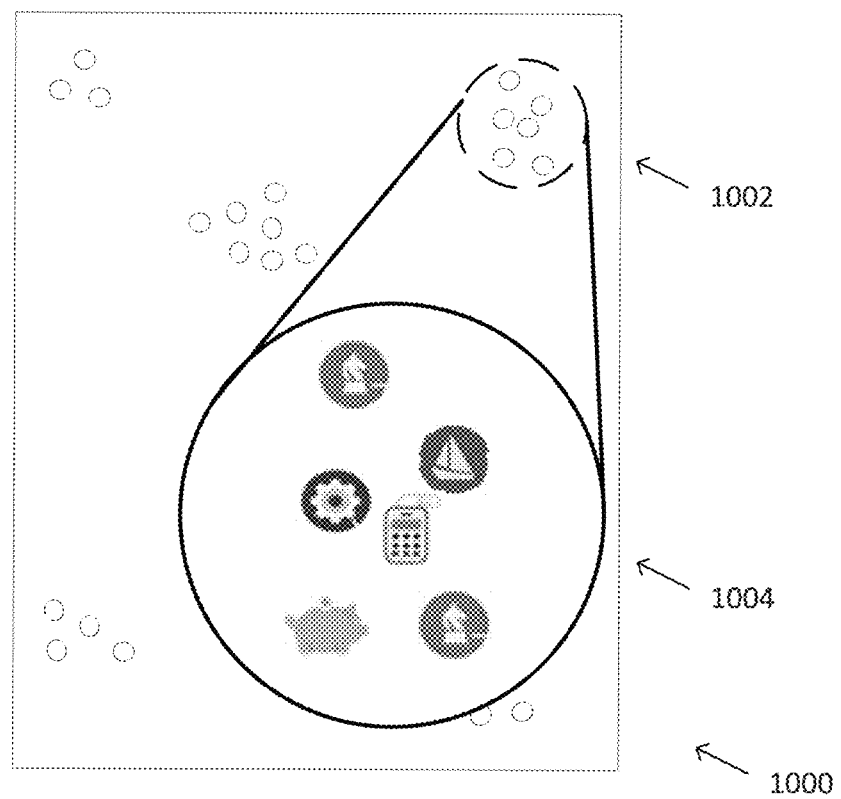
FIG. 10 is a view of a user interface screen illustrating a zoom feature of the map of FIG. 4, according to an embodiment.

Turning to FIG. 10, another embodiment of a user interface 1000 is shown, illustrating a zoom feature of the user interface 400. In this case, the electronic device 200 displays a plurality of booies over a map area. The user may interact with the user interface 1000 (e.g., via the input component 214) to control a selection area 1002 that is shown "zoomed-in" as selected area 1004.

Figure 11:
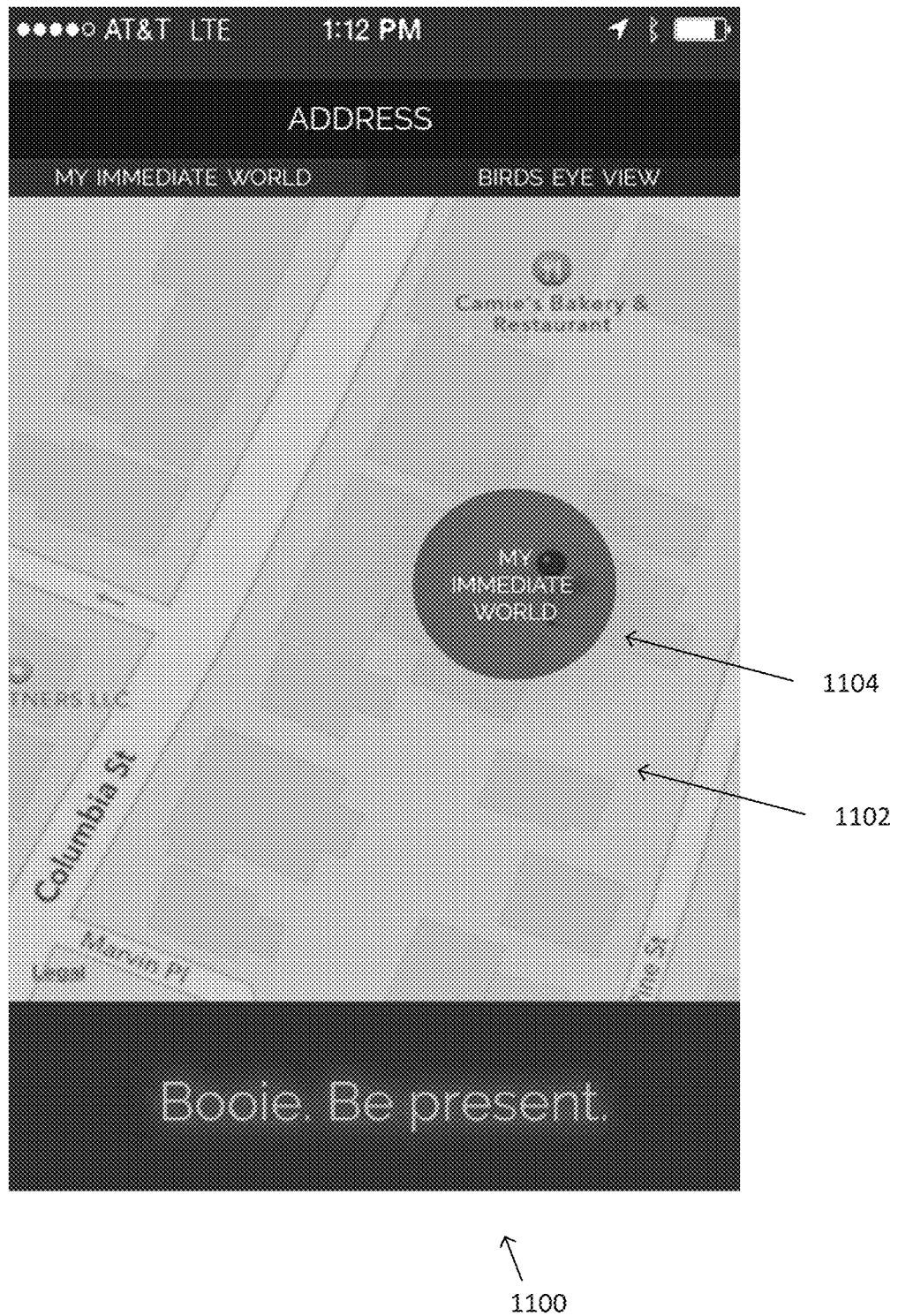
FIG. 11 is a view of a user interface screen illustrating a map that indicates a geographic region in which the electronic device of FIG. 2 is located, according to an embodiment.

FIG. 11 is a view of a map interface 1100 illustrating a map 1102 that indicates a geographic region in which the electronic device 200 is located, according to an embodiment. The map interface 1100 shows the map 1102 from a top-down perspective or "bird's eye view." The map interface 1100 includes a vicinity indicator 1104 which provides a visual representation of the immediate vicinity of the electronic device 200, as described above. In some embodiments, the map interface 1100 includes a map zoom feature for zooming in or zooming out on the map 1102. In an embodiment, the map interface 1100 includes a vicinity zoom feature that allows the user to select a radius, size, or other physical dimensions of the vicinity indicator 1104, thus allowing the user to increase or reduce a number of booies which are visible or filtered as being outside the immediate vicinity.

Figure 12:
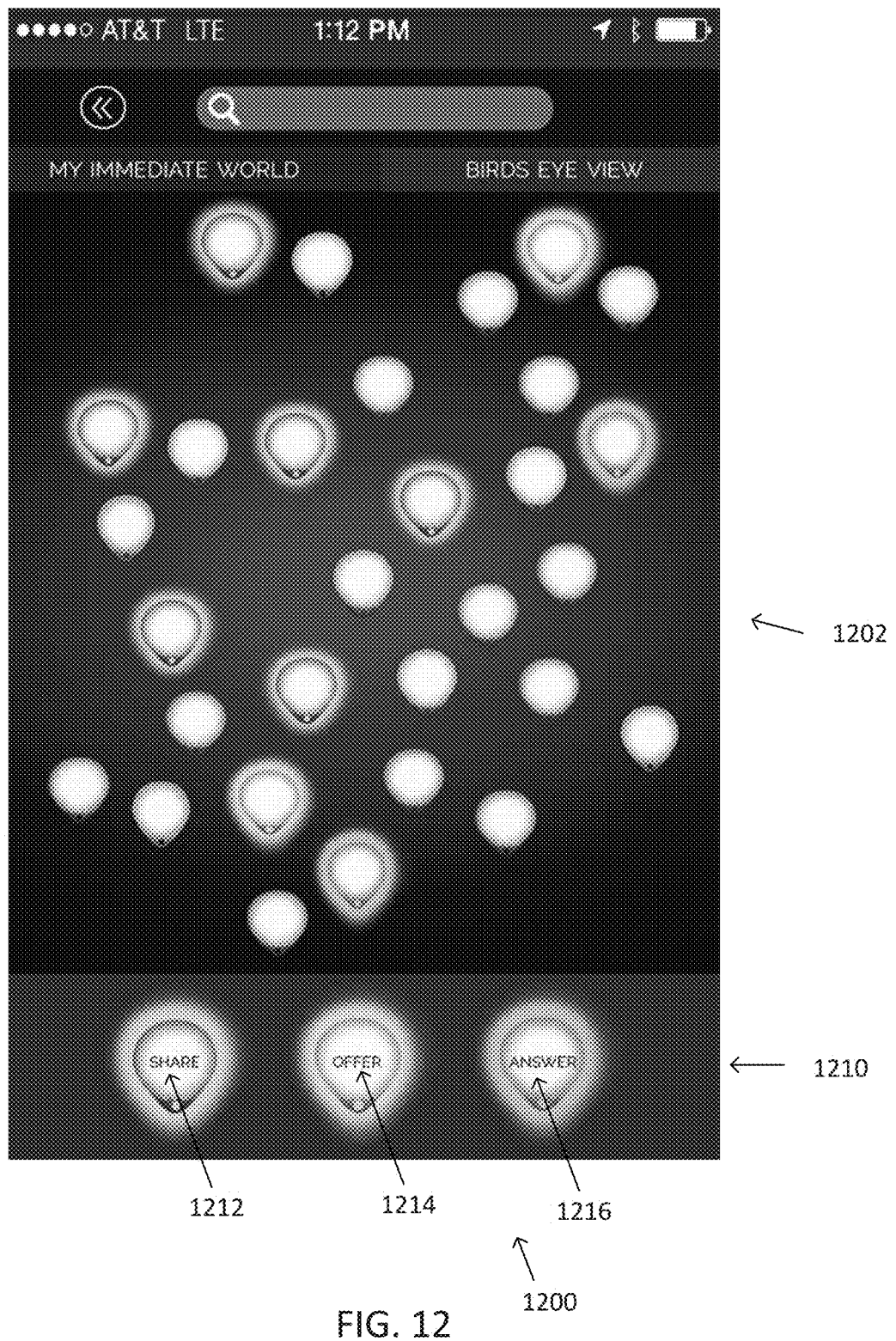
FIG. 12 is a view of a user interface screen illustrating a plurality of booies that are located within an immediate vicinity of the electronic device of FIG. 2, according to an embodiment.

FIG. 12 is a view of a user interface screen illustrating an immediate vicinity interface 1200, which displays a plurality of booies 1202 that are located within an immediate vicinity ("My Immediate World") of the electronic device 200, according to an embodiment. In the embodiment shown in FIG. 12, the booies are categorized as share booies 1212, offer booies 1214, and answer booies 1216. In some embodiments, one or more categories are displayed with a different color, shape, or other suitable visually discernible characteristic that allows a user to more easily see a desired category of booies. In an embodiment, the plurality of booies 1202 displayed in the immediate world are those booies from other electronic devices within the immediate vicinity that have been shared. In various embodiments, a user of the electronic device 200 uses the immediate vicinity interface 1200 to filter which booies are displayed by selecting or entering words, phrases, hashtags, identifier types, age ranges, gender, or other suitable criteria. In an embodiment, the immediate vicinity interface 1200 displays booies at a location on the screen corresponding to a geographic location of the corresponding electronic device. In another embodiment, the immediate vicinity interface 1200 displays booies in groups or clusters corresponding to their respective categories, common keywords, or other suitable criteria.

Figure 13:
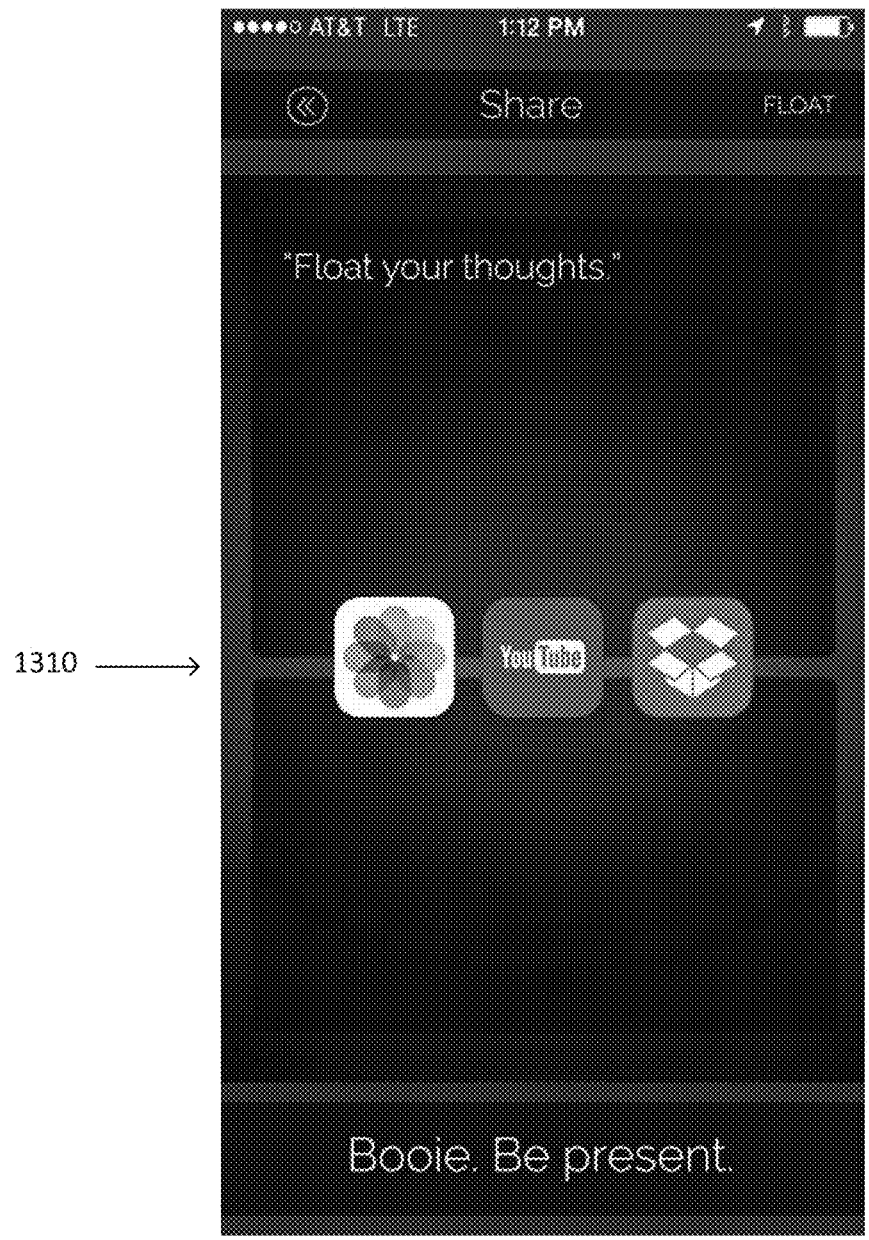
FIG. 13 is a view of a user interface screen illustrating a share booie interface, according to an embodiment.

FIG. 13 is a view of a user interface screen illustrating a share booie interface 1300, according to an embodiment. The share booie interface 1300 includes one or more input icons 1310 configured to allow a user to enter text or emoji to be displayed with a share booie, in an embodiment. In another embodiment, the input icons 1310 allow a user to select a file (e.g., an image or other media file), uniform resource locator (URL), a social media account, or social networking account to be included with or linked from the share booie. In the embodiment shown in FIG. 13, the input icons 1310 include icons for selecting an image from an imaging application, selecting a link to a YouTube video, and selecting a file from a DropBox application to be included with the share booie.

Figure 14:
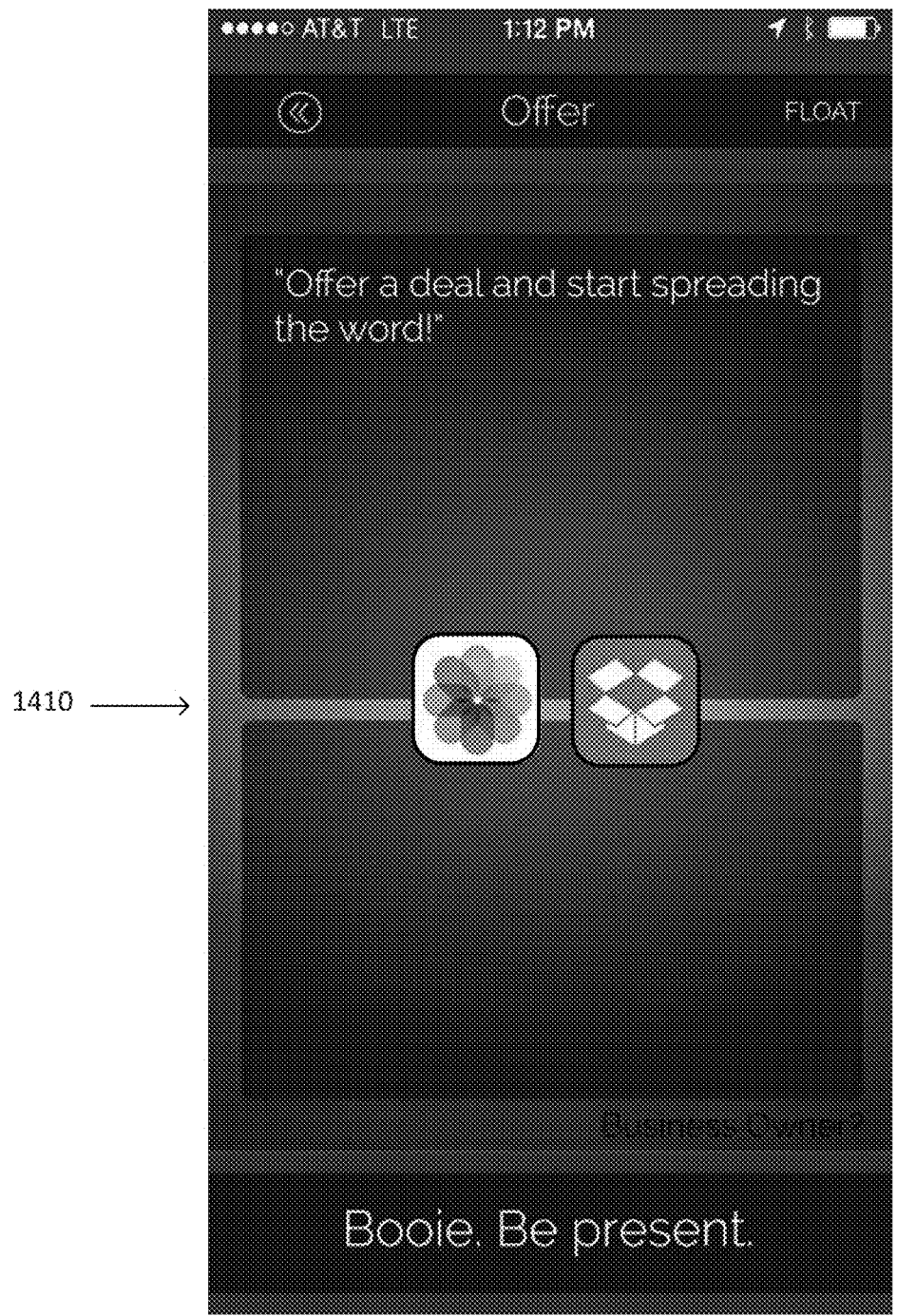
FIG. 14 is a view of a user interface screen illustrating an offer booie interface, according to an embodiment.

FIG. 14 is a view of a user interface screen illustrating an offer booie interface 1400, according to an embodiment. The offer booie interface 1400 includes one or more input icons 1410 that are configured to allow a user to enter text or emoji to be displayed with an offer booie, in an embodiment. In another embodiment, the input icons 1410 allow a user to select a file (e.g., an image or other media file) or URL to be included with the offer booie. In the embodiment shown in FIG. 14, the input icons 1410 include icons for selecting an image from an imaging application and selecting a file from a DropBox application to be included with the offer booie.

In some embodiments, the communication system 100 facilitates relationships between brands (e.g., commercial entities, well-known businesses) and consumers. Brands or other businesses can interact with users by providing an offer booie that represents the brand (i.e., a "branded booie" or advertisement information element). In another embodiment, the communication system 100 allows a brand to create an advertising campaign and send a campaign offer or invitation to join the campaign to selected users. In an embodiment, the brand owner or agent identifies specific users to receive a branded booie. In another embodiment, the users are selected by the remote server 150 based on user's floated booies, preferences, or other suitable information selected by the brand owner.

In some embodiments, the remote server 150 sends an incentive to the electronic device of the user for accepting the offer or branded booie, for example, a promotional code or discount, acceptance reward, or other suitable consideration. In an embodiment, the brand purchases one or more branded booies from an operator of the remote server 150. In some embodiments, the operator of the remote server 150 provides at least a portion of a purchase price for the branded booie to a user that has accepted the branded booie. Other examples of incentives include enhanced functionality of the electronic device 200 (i.e., an increased maximum number of booies which can be hosted).

As an example, an operator of a local restaurant provides one or more branded booies for the restaurant. In one example, the electronic device 200 displays branded booies near the restaurant on the map interface 1100, immediate vicinity interface 1200, or another suitable user interface. In another example, the electronic device 200 provides a separate prompt to a user to accept or reject the branded booie. If the user accepts a branded booie, the electronic device 200 places the branded booie on the user's dashboard and thus becomes visible to other users within the vicinity of the selected user, even as that user travels to other locations. In some embodiments, the branded booie includes a link for purchasing the product, for example, included in the user information of the branded booie. In an embodiment, the branded booie includes promotional codes for certain deals or offers the brand wishes to promote. The selected users then present the promotional code to other users in their immediate world by floating the branded booie, which could increase customer traffic to and sales for the restaurant.

Figure 15:
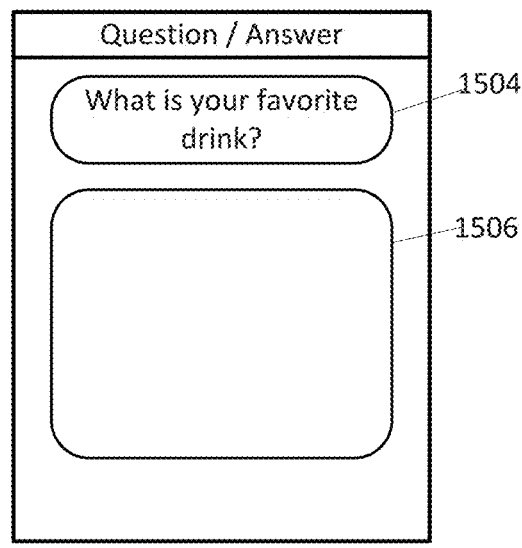
FIG. 15 is a view of a user interface screen illustrating an answer booie interface, according to an embodiment.

FIG. 15 is a view of a user interface screen illustrating an answer booie interface 1500, according to an embodiment. The answer booie interface 1500 includes a question window 1504 and an answer window 1506 used to generate an answer booie. In an embodiment, the answer booie interface 1500 displays a predetermined question to the user of the electronic device 200 in the question window 1504. In another embodiment, the electronic device 200 requests a question from the remote server 150 (e.g., from the memory 152) for display via the answer booie interface 1500. In some embodiments, the answer booie interface 1500 allows the user to select a question to answer. The answer booie interface 1500 allows the user to enter an answer to the displayed question in the answer window 1506. In various embodiments, the answer window 1506 includes two or more selectable answers (i.e., multiple choice answers) for the question displayed in the question window 1504. In other embodiments, the answer window 1506 allows the user to enter text, emoji, images, or files. In an embodiment, the answer booie includes a question or other suitable text selected to prompt conversation about a topic, such as a "would you rather," "I Spy," or "Mad-lib" type capability.

Figure 16:
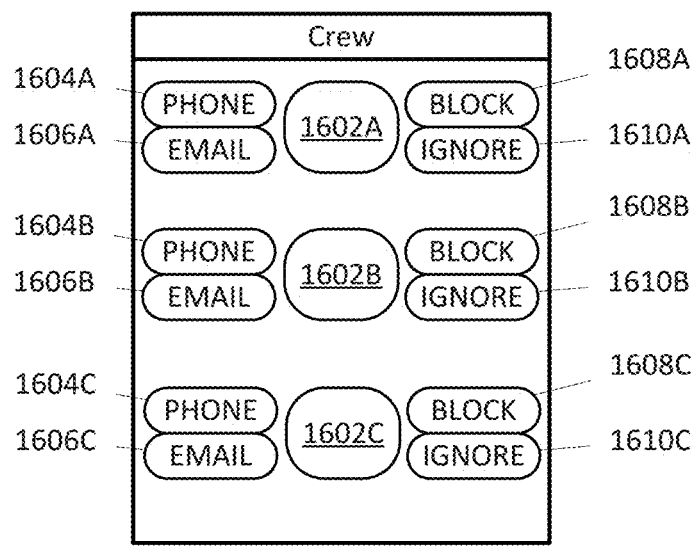
FIG. 16 is a view of a user interface screen illustrating a crew interface, according to an embodiment.

FIG. 16 is a view of a user interface screen illustrating a crew interface 1600, according to an embodiment. The crew interface 1600 stores requests from other users who have requested to connect. For example, a first user of a first electronic device selects a booie from the immediate vicinity interface 1200, then the immediate vicinity interface 1200 allows the first user to send a request to a second user of a second electronic device that corresponds to the selected booie. In some scenarios, the crew interface 1600 simplifies a face-to-face meeting, phone call, or email exchange between two users with similar interests when they otherwise would have difficulty locating each other, for example, in a large convention hall with many people. In an embodiment, the request is sent directly from the first electronic device to the second electronic device, for example, via Bluetooth or another suitable communication interface. In another embodiment, the first electronic device sends the request via the remote server 150.

In an embodiment, the crew interface 1600 includes a profile image 1602 for the displayed pending requests. In the embodiment shown in FIG. 16, each profile image 1602 corresponds to a set of buttons 1604, 1606, 1608, and 1610 for responding to the request with one or more actions. In various embodiments, the one or more actions include sharing their phone number with the first electronic device (button 1604), sharing their email address with the first electronic device (button 1606), blocking the user of the first electronic device from sending further requests (button 1608), and/or ignoring the request from the first electronic device (button 1610). In an embodiment, the action of blocking also hides the booies of the second user from being displayed to the first user. In another embodiment, the crew interface 1600 provides a "look for me" response. In this embodiment, the second electronic device sends the response to indicate that the second user has accepted the request and would like to meet the user of the first electronic device. In some embodiments, the look for me response includes an image (e.g., a profile image of the second user), text description, or location information to aid the first user in locating the second user.

Figure 17:
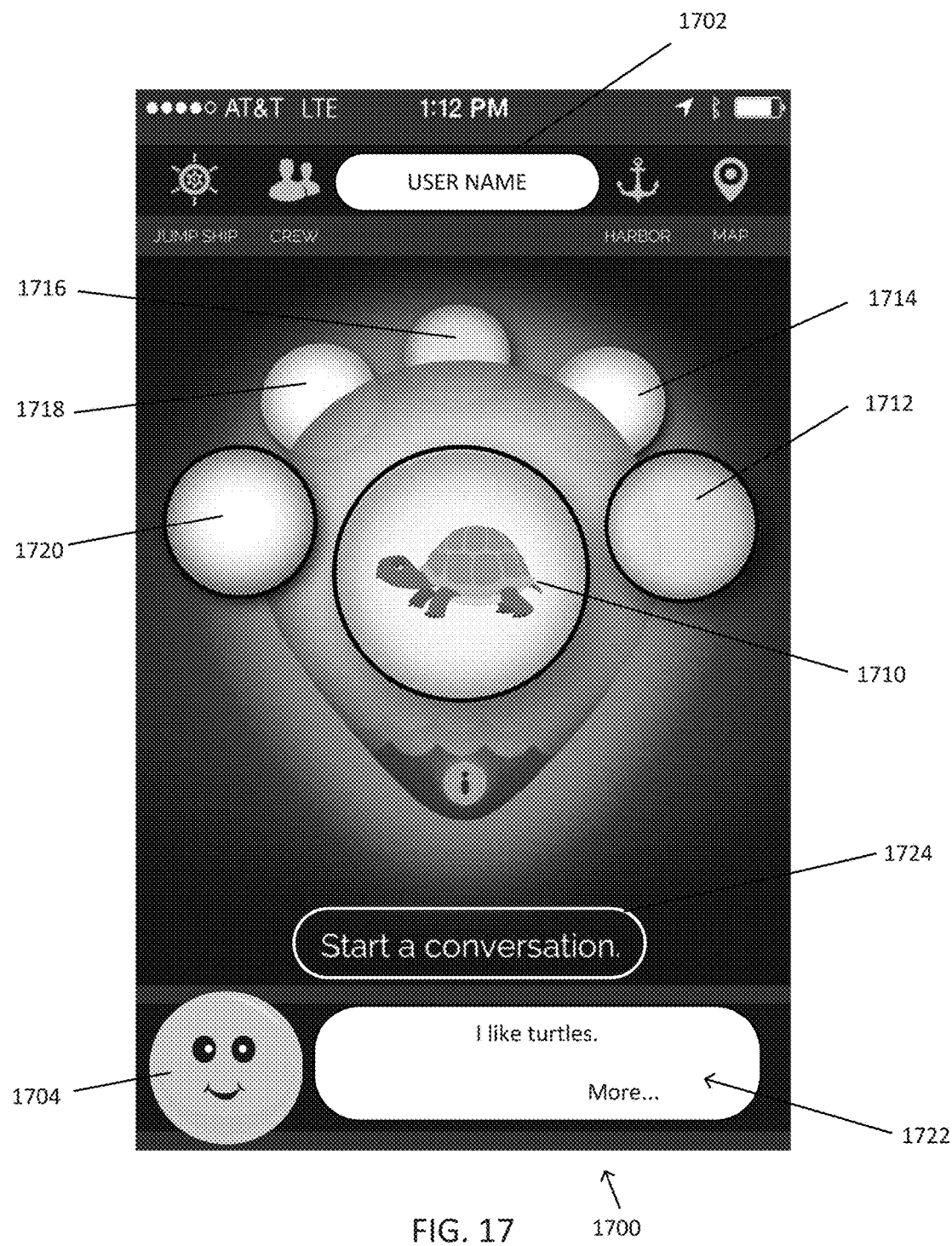
FIG. 17 is a view of a user interface screen illustrating a conversation interface, according to an embodiment.

FIG. 17 is a view of a user interface screen illustrating a user profile interface 1700 or "dashboard" displayed by the electronic device 200, according to an embodiment. In an embodiment, the user profile interface 1700 is displayed to allow a user to change which booies they have "floated" (i.e., made available for other users to see). In some embodiments, the user profile interface 1700 is configured to store one or more booies which a user does not currently want on their dashboard, but would like to keep for potential use at a later time. In some embodiments, the user profile interface 1700 allows the user to select or upload an avatar or profile picture, allowing other users to identify them more easily in real life. In another embodiment, the user profile interface 1700 for other users to see which booies a selected user has "floated." In the embodiment of FIG. 17, the user profile interface 1700 includes a user name 1702, profile image 1704 or avatar, and booies 1710, 1712, 1714, 1716, 1718, and 1720. In an embodiment, the booies are alternately selected, for example, by swiping to rotate the plurality of booies. A currently selected booie (i.e., booie 1710 as shown in FIG. 17) displays information such as an image or text within the booie, with additional information for the selected booie shown in a display window 1722. In an embodiment, the user profile interface 1700 includes an input icon 1724 that triggers the electronic device 200 to send a request to connect or "start a conversation," as described above. The user interface of the electronic device 200 in one example provides a chat function. The chat function may be specific to a booie or to users in proximity to each other (e.g., within 100 meters, in a same town). For example, a user may restrict incoming chat messages to those with similar booies by using permissions or filters.

The user profile interface 1700 in some embodiments allows the user to provide additional user information for one or more booies, such as a custom user description, links to websites, blogs, videos, social media pages, or other suitable information through share booies, offer booies, answer booies, or custom booies. The dashboard allows a user to organize and personalize booies that will appear on other users maps.

Figure 18:
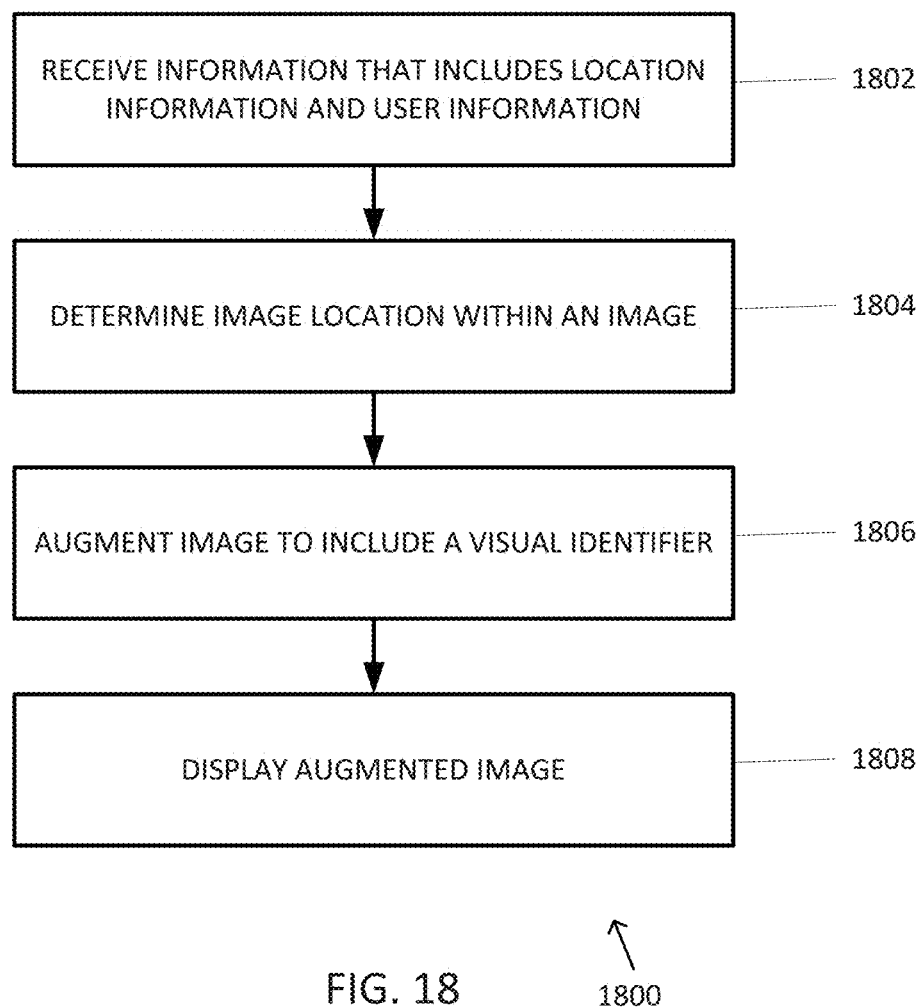
FIG. 18 is a flow diagram illustrating an example method, implemented in an electronic device, for displaying an augmented image, according to an embodiment.

FIG. 18 is a flow diagram illustrating an example method 1800, implemented in an electronic device, for displaying an augmented image, according to an embodiment. In some embodiments, the method 1800 is implemented by a first mobile device, such as the electronic device 200 of FIG. 2. In other embodiments, however, the method 1800 is implemented by another suitable electronic device.

At block 1802, information is received by the first mobile device, which includes i) location information for a second mobile device at a geographical location proximate to the first mobile device. The received information also includes user information selected by a user of the second mobile device. For example, the information corresponds to one or more booies which have been "floated" by the user of the second mobile device. In some embodiments, the first mobile device receives the information directly from the second mobile device. In other embodiments, the first mobile device sends a request to a remote server to obtain the information.

At block 1804, an image location is determined, within an image, that indicates a relative location of the second mobile device based on an orientation of the first mobile device and the location information for the second mobile device. For example, the first mobile device determines an image location on the user interface 400, the augmented reality interface 500, the overlay 600, the map interface 1100, or the immediate vicinity interface 1200.

In some embodiments, the first mobile device captures a live-view image as the image. In this case, the first mobile device determines the image location within the live-view image that indicates the relative location of the second mobile device based on a three-dimensional orientation of the first mobile device and the location information for the second mobile device. For example, the first mobile device determines a suitable image location for the visual identifier such that the booie appears adjacent to the second mobile device (or the user of the second mobile device) within the live-view image, as shown in FIGS. 5 and 6. In some embodiments, as the user of the first mobile device walks around and/or tilts the first mobile device, thus changing the orientation of the camera 212, the first mobile device automatically updates the live-view image and the image location that indicates the relative location of the second mobile device.

In some embodiments, the first mobile device determines whether the second mobile device is located within a captured live-view image. If the second mobile device is not located within the live-view image, the first mobile device selects a suitable visual directional indicator (e.g., directional indicators 502, 504, 602, or 604) that corresponds to a direction in which the first mobile device should be oriented to include the second mobile device in the live-view image. In another embodiment, the first mobile device receives a geographical map image as the image, for example, from a map application on the first mobile device.

At block 1806, the image is augmented to include a visual identifier that corresponds to the second mobile device at the image location. For example, the first mobile device selects a visual identifier (i.e., an image or icon) for a booie and augments the image to include or otherwise display the visual identifier. In an embodiment, the first mobile device selects the visual identifier based on the user information selected by the user of the second mobile device. For example, if the user of the second mobile device has selected a personalized icon, the personalized icon (or a suitable indicator thereof) is included with the user information from the second mobile device. In an embodiment, the first mobile device determines matched information that is common between i) the user information selected by the user of the second mobile device, and ii) user information selected by a user of the first mobile device and selects the visual identifier to indicate the matched information. Accordingly, a user having a same or similar booie (e.g., a different answer to a same question) as another user can more easily view the similar booie.

At block 1808, the augmented image is displayed to the user of the first mobile device. For example, the first mobile device displays the user interface 400, the augmented reality interface 500, the overlay 600, the map interface 1100, or the immediate vicinity interface 1200 with the visual identifier corresponding to the booie floated by the user of the second mobile device.

Figure 19:
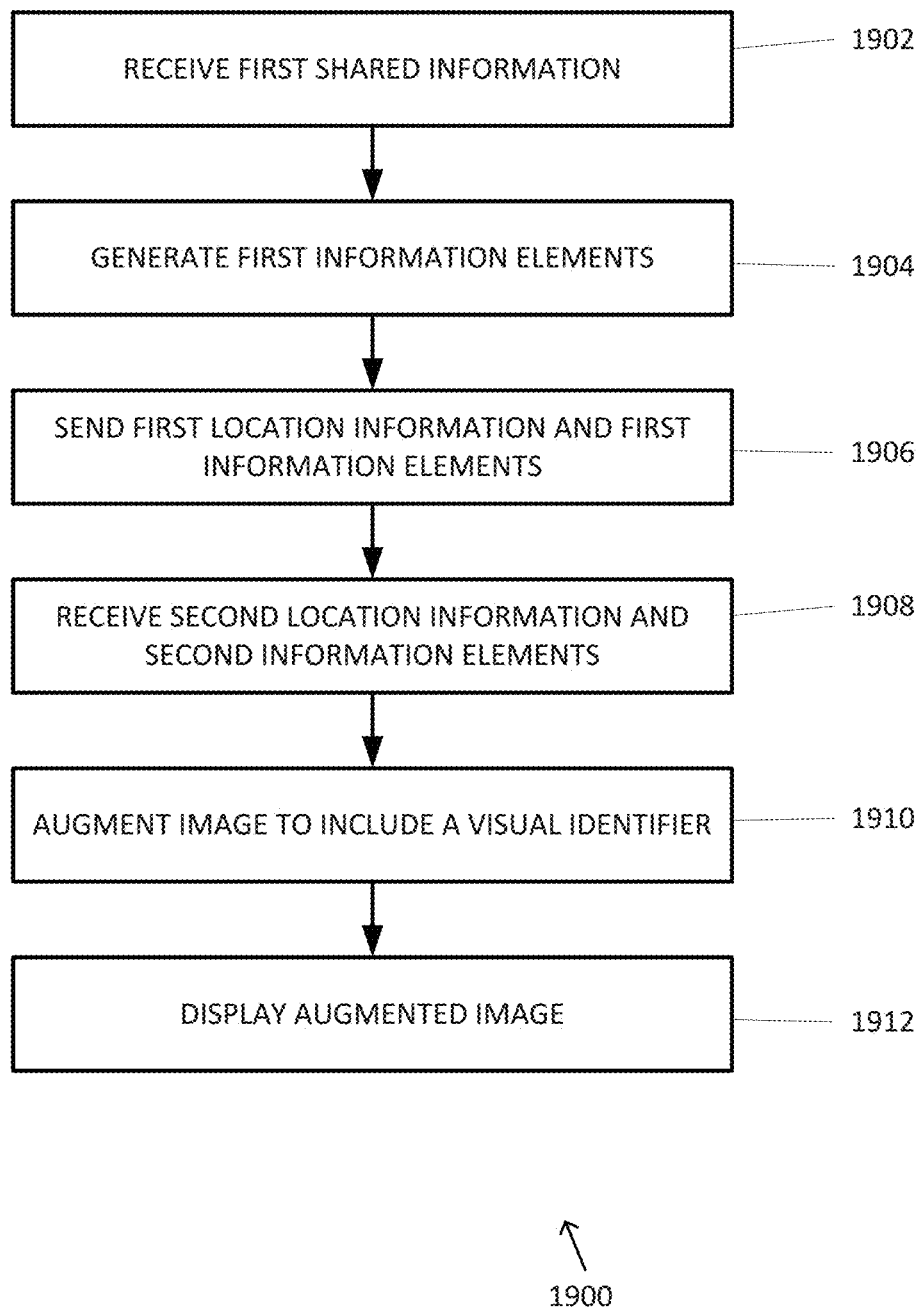
FIG. 19 is a flow diagram illustrating another example method, implemented in an electronic device, for displaying an augmenting image, according to an embodiment.

FIG. 19 is a flow diagram illustrating another example method, implemented in an electronic device, for displaying an augmenting image, according to an embodiment. In some embodiments, the method 1900 is implemented by a first mobile device, such as the electronic device 200 of FIG. 2. In other embodiments, however, the method 1900 is implemented by another suitable electronic device.

At block 1902, first shared user information is received by the first mobile device. The first shared user information is provided by a user of the first mobile device. In various embodiments, the first shared user information includes text, images, URLs, or other information suitable for generation of a booie (a share booie, offer booie, answer booie, etc.).

At block 1904, the first mobile device generates one or more first information elements that correspond to the first shared user information. For example, the first mobile device generates a booie that includes at least a portion of the first shared user information. In some embodiments, the first shared user information includes text entered by the user and also a selected visual identifier (i.e., an icon) to be displayed with the booie.

At block 1906, the first mobile device sends to the remote server 150 i) first location information that indicates a geographical location of the first mobile device, and ii) the one or more first information elements. Examples of the first location information include GPS coordinates, detected wireless access point names, or other suitable location information. Upon receipt of the first location information and the information elements, the remote server 150 determines which, if any, other mobile devices are located near the first mobile device. For example, the remote server 150 determines which mobile devices are within the immediate vicinity of the first mobile device. In some embodiments, the remote server 150 also determines which mobile devices are within a predetermined range to the immediate vicinity.

At block 1908, the first mobile device receives from the remote server 150 a response to the geographical location and the one or more first information elements. The response includes i) second location information that indicates a geographical location of a second mobile device, and ii) one or more second information elements that correspond to or second shared user information provided by a user of the second mobile device. For example, assuming that at least one second mobile device is located within the immediate vicinity of the first mobile device, the remote server 150 provides a response that includes the location of the second mobile device and information the booies floated by the second mobile device.

At block 1910, an image is augmented to include a visual identifier that corresponds to at least one of the second information elements based on the second location information. In an embodiment, the first mobile device determines an image location, within the image, that indicates a relative location of the second mobile device based on an orientation of the first mobile device and the location information for the second mobile device. For example, the first mobile device determines an image location on the user interface 400, the augmented reality interface 500, the overlay 600, the map interface 1100, or the immediate vicinity interface 1200, selects a visual identifier (i.e., an image or icon) for a booie, and augments the image to include or otherwise display the visual identifier.

At block 1912, the augmented image is displayed to the user of the first mobile device. For example, the first mobile device displays the user interface 400, the augmented reality interface 500, the overlay 600, the map interface 1100, or the immediate vicinity interface 1200 with the visual identifier corresponding to the booie floated by the user of the second mobile device.

In some embodiments, the mobile device receives a push notification that includes i) third location information that indicates a geographical location of a commercial entity, and ii) an information element that correspond to an offer from the commercial entity. In various embodiments, the push notification is received from the remote server 150, the wireless network 130, and/or the transmitter 113. In this embodiment, the first mobile device determines an image location, within the image, that indicates a relative location of the commercial entity based on an orientation of the first mobile device and the third location information. The first mobile device augments the image to include an additional visual identifier at the image location.

Figure 20:
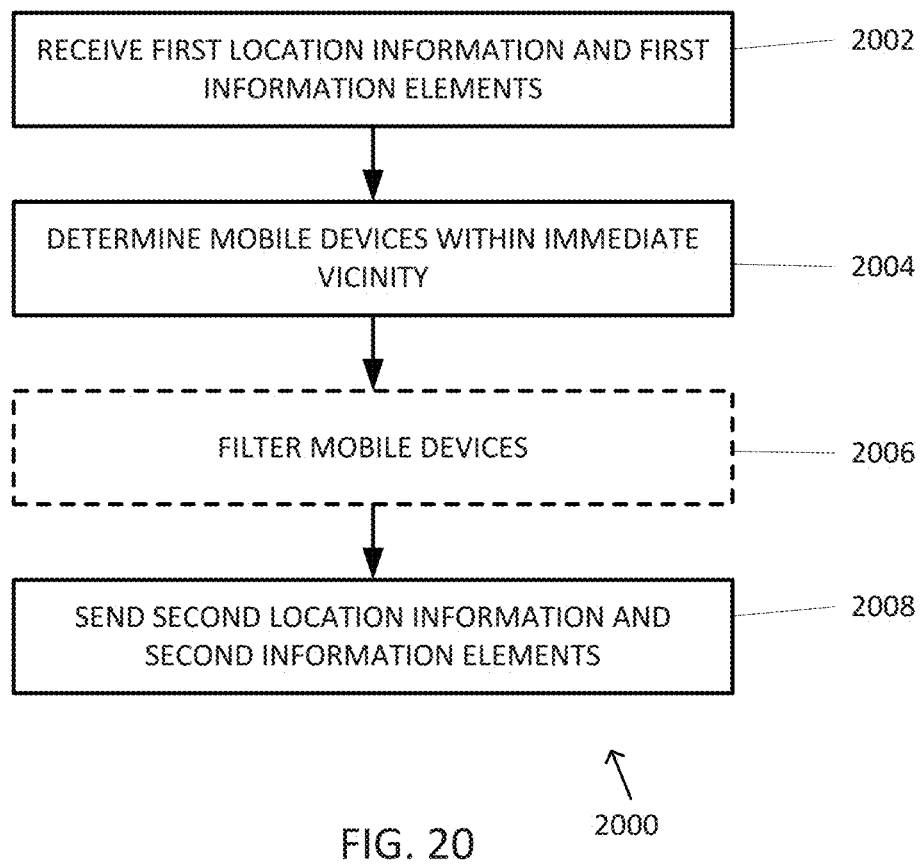
FIG. 20 is a flow diagram illustrating an example method, implemented in a remote server, for providing booies to a mobile device, according to an embodiment.

FIG. 20 is a flow diagram illustrating an example method, implemented in a remote server, for providing booies to a mobile device, according to an embodiment. In some embodiments, the method 2000 is implemented by remove server 150 of FIG. In other embodiments, however, the method 2000 is implemented by another suitable electronic device.

At block 2002, the remote server 150 receives first location information and first information elements from a first mobile device. For example, the remote server 150 receives the information transmitted by the first mobile device in block 1906 of FIG. 19.

At block 2004, the remote server 150 determines which mobile devices are within the immediate vicinity of the first mobile device. In some embodiments, the remote server 150 generates a list or other suitable data structure that includes the mobile devices. The remote server 150 in some embodiments uses geo-fences to select suitable mobile devices, for example, mobile devices within a predetermined radius of the first mobile device or within a same building.

At block 2006, the remote server 150 optionally filters one or more mobile devices from the list. In various embodiments, the remote server 150 is configured to filter mobile devices based on location, orientation, proximity or user-selectable values for defining an "immediate vicinity" of the first mobile device, selected demographic identifiers such as, but not limited to, gender and age, or other suitable values, as described above with respect to the electronic device 200. In some embodiments, the remote server 150 stores a local copy of booies for the first mobile device within the memory 152. In this case, the remote server 150 filters the list to include mobile devices that have booies in common with the first mobile device.

At block 2008, the remote server 150 sends a response to the mobile device that includes the list of mobile devices and their corresponding booies, in an embodiment. In another embodiment, the remote server 150 sends a push notification to the mobile devices within the list that indicates the first mobile device is within range to facilitate their detection of the first mobile device.

It can be seen from the foregoing that a method and system for a communication system have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface 400 devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

What is claimed is:

1. A method on a first mobile device, comprising:
   receiving information that includes i) location information for a second mobile device at a geographical location proximate to the first mobile device, and ii) user information selected by a user of the second mobile device;
   receiving, from a remote server, a campaign offer that corresponds to an advertising campaign for a commercial entity;
   prompting the user of the first mobile device to accept the campaign offer for the advertising campaign;
   if the user of the first mobile device accepts the campaign offer, generating an advertisement information element that corresponds to the advertising campaign, wherein the advertisement information element corresponds to a branded visual identifier for the advertising campaign to be displayed in an augmented reality interface of the second mobile device and other mobile devices at geographical locations proximate to the first mobile device;
   determining an image location, within an image of an augmented reality interface, that indicates a relative location of the second mobile device based on an orientation of the first mobile device and the location information for the second mobile device;
   augmenting the image to include a visual identifier that corresponds to the second mobile device at the image location; and
   displaying the augmented reality interface that includes the augmented image;
   wherein augmenting the image comprises:
     determining matched information that is common between i) the user information selected by the user of the second mobile device, and ii) user information selected by a user of the first mobile device, and
     selecting the visual identifier to indicate the matched information.

2. The method of claim 1, further comprising capturing, by the first mobile device, a live-view image that includes the user of the second mobile device as the image;

wherein determining the image location comprises determining the image location within the live-view image that appears adjacent to the user of the second mobile device based on a three-dimensional orientation of the first mobile device and the location information for the second mobile device; and wherein augmenting the image comprises augmenting the live-view image to include the visual identifier at the image location.

3. The method of claim 1, further comprising receiving a geographical map image as the image;

wherein augmenting the image comprises augmenting the geographical map image to include the visual identifier at the image location.

4. The method of claim 1, wherein receiving the information comprises receiving the information at the first mobile device directly from the second mobile device via a wireless communication interface.

5. The method of claim 1, further comprising capturing, by the first mobile device, a live-view image as the image;

wherein determining the image location comprises:
  determining that the second mobile device is not located within the live-view image;
  selecting the image location and a visual directional indicator that corresponds to a direction in which the first mobile device should be oriented to include the second mobile device in the live-view image;

wherein augmenting the image comprises augmenting the live-view image to include the visual directional indicator at the image location.

6. A method on a first mobile device, comprising:

receiving first shared user information provided by a user of the first mobile device;

receiving, from a remote server, a campaign offer that corresponds to an advertising campaign for a commercial entity;

prompting the user of the first mobile device to accept the campaign offer for the advertising campaign;

generating one or more first information elements that correspond to the first shared user information;

if the user of the first mobile device accepts the campaign offer, generating an advertisement information element that corresponds to the advertising campaign, wherein the advertisement information element corresponds to a branded visual identifier for the advertising campaign to be displayed in an augmented reality interface of a third mobile device and other mobile devices at geographical locations proximate to the first mobile device;

sending to the remote server i) first location information that indicates a geographical location of the first mobile device, and ii) the one or more first information elements and the advertisement information element;

receiving, from the remote server, a response to the geographical location and the one or more first information elements, the response including i) second location information that indicates a geographical location of a second mobile device, and ii) one or more second information elements that correspond to second shared user information provided by a user of the second mobile device;

augmenting an image of an augmented reality interface to include a visual identifier that corresponds to at least one of the second information elements based on the second location information; and displaying the augmented reality interface that includes the augmented image;

wherein augmenting the image comprises:

selecting a matched information element that is common between i) the one or more first information elements, and ii) the one or more second information elements; and selecting the visual identifier based on the matched information element.

7. The method of claim 6, wherein augmenting the image further comprises:

determining an image location, within the image of the augmented reality interface, that indicates a relative location of the second mobile device based on an orientation of the first mobile device and the second location information; and augmenting the image to include the visual identifier at the image location.

8. The method of claim 7, further comprising capturing, by the first mobile device, a live-view image that includes the user of the second mobile device as the image;

wherein determining the image location comprises determining the image location within the live-view image that appears adjacent to the user of the second mobile device within the live-view image based on a three-dimensional orientation of the first mobile device and the second location information; and wherein augmenting the image comprises augmenting the live-view image to include the visual identifier at the image location.

9. The method of claim 6, further comprising:

receiving, from the remote server, a push notification that includes i) third location information that indicates a geographical location of a commercial entity, and ii) an information element that correspond to an offer from the commercial entity;

determining an image location, within the image of the augmented reality interface, that indicates a relative location of the commercial entity based on an orientation of the first mobile device and the third location information; and augmenting the image to include an additional visual identifier at the image location.

10. The method of claim 6, further comprising receiving an incentive if the user of the first mobile device accepts the campaign offer.

11. The method of claim 6, wherein receiving the response comprises receiving a plurality of responses to the geographical location and the one or more first information elements, each response of the plurality of responses including i) respective location information that indicates a geographical location of a respective mobile device, and ii) one or more respective information elements provided by a user of the respective mobile device;

wherein augmenting the image comprises augmenting the image to include a plurality of visual identifiers that correspond to the plurality of responses.

12. A first mobile device, comprising:

a processor, a display, a non-transitory memory, and a network interface device;

the processor having one or more integrated circuits configured to:

receive information that includes i) location information for a second mobile device at a geographical location proximate to the first mobile device, and ii) user information selected by a user of the second mobile device, receive, from a remote server, a campaign offer that corresponds to an advertising campaign for a commercial entity, prompt the user of the first mobile device to accept the campaign offer for the advertising campaign, if the user of the first mobile device accepts the campaign offer, generate an advertisement information element that corresponds to the advertising campaign and send the advertisement information element to the remote server, wherein the advertisement information element corresponds to a branded visual identifier for the advertising campaign to be displayed in an augmented reality interface of the second mobile device and other mobile devices at geographical locations proximate to the first mobile device, determine an image location, within an image of an augmented reality interface, that indicates a relative location of the second mobile device based on an orientation of the first mobile device and the location information for the second mobile device, determine matched information that is common between i) the user information selected by the user of the second mobile device, and ii) user information selected by a user of the first mobile device, select a visual identifier that corresponds to the second mobile device to indicate the matched information, augment the image to include the visual identifier that corresponds to the second mobile device at the image location, and display the augmented reality interface that includes the augmented image on the display.

13. The first mobile device of claim 12, further comprising a camera configured to capture a live-view image that includes the user of the second mobile device as the image;

the processor having one or more integrated circuits configured to determine the image location within the live-view image that appears adjacent to the user of the second mobile device within the live-view image based on a three-dimensional orientation of the first mobile device and the location information for the second mobile device, and augment the live-view image to include the visual identifier at the image location.

14. The method of claim 1, wherein:

the visual identifier is a first visual identifier;

the method further comprises selecting a second visual identifier to indicate at least some of the user information selected by the user of the second mobile device; and augmenting the image to include the visual identifier comprises augmenting the image to include the first visual identifier and the second visual identifier.

15. The method of claim 6, wherein:

the visual identifier is a first visual identifier;

the method further comprises selecting a second visual identifier to indicate at least some of the one or more second information elements; and augmenting the image to include the visual identifier comprises augmenting the image to include the first visual identifier and the second visual identifier.

16. The first mobile device of claim 12, wherein:

the visual identifier is a first visual identifier;

the processor has one or more integrated circuits configured to select a second visual identifier to indicate at least some of the user information selected by the user of the second mobile device; and the processor has one or more integrated circuits configured to augment the image to include the first visual identifier and the second visual identifier.

* * * * *